(12) United States Patent
O'Sullivan et al.

(10) Patent No.: US 11,044,022 B2
(45) Date of Patent: Jun. 22, 2021

(54) BACK-TO-BACK ISOLATION CIRCUIT

(71) Applicant: Analog Devices Global Unlimited Company, Hamilton (BM)

(72) Inventors: Laurence B. O'Sullivan, Limerick (IE); Shane Geary, Sixmilebridge (IE); Baoxing Chen, Westford, MA (US); Bernard Patrick Stenson, Limerick (IE); Paul Lambkin, Carrigaline (IE); Patrick M. McGuinness, Limerick (IE); Stephen O'Brien, Clarina (IE); Patrick J. Murphy, Patrickswell (IE)

(73) Assignee: Analog Devices Global Unlimited Company, Hamilton (BM)

( * ) Notice: Subject to any disclaimer, the term of this patent is extended or adjusted under 35 U.S.C. 154(b) by 0 days.

(21) Appl. No.: 16/287,796

(22) Filed: Feb. 27, 2019

(65) Prior Publication Data
US 2020/0076512 A1 Mar. 5, 2020

Related U.S. Application Data

(60) Provisional application No. 62/724,166, filed on Aug. 29, 2018.

(51) Int. Cl.
*H04B 10/80* (2013.01)
*H01F 27/28* (2006.01)

(52) U.S. Cl.
CPC ......... *H04B 10/802* (2013.01); *H01F 27/288* (2013.01)

(58) Field of Classification Search
CPC .................................................. H04B 10/802
(Continued)

(56) References Cited

U.S. PATENT DOCUMENTS 5,354,695 A 10/1994 Leedy
5,512,774 A 4/1996 Nakagawa et al.
(Continued)

FOREIGN PATENT DOCUMENTS

CN 203554302 U 4/2014
CN 104022113 A 9/2014
(Continued)

OTHER PUBLICATIONS

Chen, Isolation in Digital Power Supplies Using Micro-Transformers. IEEE. 2009; 2039-2042.
(Continued)

*Primary Examiner* — Stanley Tso
(74) *Attorney, Agent, or Firm* — Wolf, Greenfield & Sacks, P.C.

(57) ABSTRACT

Isolators having a back-to-back configuration for providing electrical isolation between two circuits are described, in which multiple isolators formed on a single, monolithic substrate are connected in series to achieve a higher amount of electrical isolation for a single substrate than for isolators formed on separate substrates connected in series. Discrete dielectric regions positioned between isolator components forming an isolator provide electrical isolation between the isolator components as well as between the isolators formed on the substrate. The back-to-back isolator may provide one or more communication channels for transfer of information and/or power between different circuits.

24 Claims, 14 Drawing Sheets

(58) Field of Classification Search
USPC .......................................................... 174/260
See application file for complete search history.

(56) References Cited

U.S. PATENT DOCUMENTS

| | | | |
|---|---|---|---|
| 5,684,660 A | 11/1997 | Gray et al. | |
| 5,969,590 A | 10/1999 | Gutierrez | |
| 6,448,536 B2 | 9/2002 | Li et al. | |
| 6,512,437 B2 | 1/2003 | Jin et al. | |
| 6,927,662 B2 | 8/2005 | Kahlmann et al. | |
| 7,282,789 B2 | 10/2007 | Kinsman | |
| 7,489,526 B2 | 2/2009 | Chen et al. | |
| 7,545,059 B2 | 6/2009 | Chen et al. | |
| 7,741,943 B2 | 6/2010 | Fouquet et al. | |
| 7,856,219 B2 | 12/2010 | Dupuis | |
| 7,902,627 B2 | 3/2011 | Dong et al. | |
| 7,923,710 B2 | 4/2011 | Crawley et al. | |
| 7,947,600 B2 | 5/2011 | Iwaya et al. | |
| 8,061,017 B2 | 11/2011 | Fouquet et al. | |
| 8,064,872 B2 | 11/2011 | Dupuis | |
| 8,237,534 B2 | 8/2012 | Fouquet et al. | |
| 8,446,243 B2 | 5/2013 | Strzalkowski et al. | |
| 8,569,861 B2 | 10/2013 | O'Donnell et al. | |
| 8,614,616 B2 | 12/2013 | Willkofer et al. | |
| 8,643,138 B2 | 2/2014 | Dong | |
| 8,742,539 B2 | 6/2014 | Weyers et al. | |
| 9,105,391 B2 | 8/2015 | Fouquet et al. | |
| 9,318,784 B2 | 4/2016 | Sin et al. | |
| 9,380,705 B2 | 6/2016 | Chen | |
| 9,496,926 B2 | 11/2016 | Bhamidipati et al. | |
| 9,508,485 B1 | 11/2016 | Vinciarelli | |
| 9,735,112 B2 | 8/2017 | Constantino et al. | |
| 9,761,545 B2 | 9/2017 | Sin et al. | |
| 9,812,389 B2 | 11/2017 | Ho et al. | |
| 9,893,008 B2 | 2/2018 | Bonifield et al. | |
| 9,929,038 B2 | 3/2018 | O'Sullivan | |
| 10,074,939 B1 | 9/2018 | Briano | |
| 10,121,847 B2 | 11/2018 | Cook et al. | |
| 2001/0000303 A1 | 4/2001 | Sasaki | |
| 2004/0060164 A1 | 4/2004 | Wan et al. | |
| 2004/0101226 A1 | 5/2004 | Zbinden | |
| 2005/0024176 A1 | 2/2005 | Wang et al. | |
| 2006/0226924 A1 | 10/2006 | Chen et al. | |
| 2008/0080624 A1* | 4/2008 | Feldtkeller | H04B 3/02 |
| | | | 375/244 |
| 2008/0258561 A1* | 10/2008 | Mercer | H02J 9/06 |
| | | | 307/42 |
| 2008/0277761 A1 | 11/2008 | Mahalingam et al. | |
| 2008/0311862 A1 | 12/2008 | Spina et al. | |
| 2009/0230776 A1* | 9/2009 | Ochi | H01F 19/00 |
| | | | 307/83 |
| 2010/0147215 A1* | 6/2010 | Baumann | B05B 5/10 |
| | | | 118/621 |
| 2011/0095620 A1 | 4/2011 | Fouquet et al. | |
| 2013/0027170 A1 | 1/2013 | Chen | |
| 2013/0154071 A1 | 6/2013 | Haigh et al. | |
| 2014/0145301 A1 | 5/2014 | Moghe et al. | |
| 2014/0252533 A1 | 9/2014 | O'Sullivan | |
| 2015/0069572 A1 | 3/2015 | Khanolkar et al. | |
| 2015/0200162 A1 | 7/2015 | Constantino et al. | |
| 2015/0357113 A1 | 12/2015 | Scholz | |
| 2017/0117084 A1* | 4/2017 | Murphy | H01L 33/44 |
| 2018/0130867 A1 | 5/2018 | Lambkin et al. | |
| 2019/0109233 A1 | 4/2019 | Tellkamp et al. | |
| 2019/0222112 A1* | 7/2019 | Sakai | G03G 15/80 |

FOREIGN PATENT DOCUMENTS

| | | |
|---|---|---|
| CN | 104838458 A | 8/2015 |
| CN | 206602009 U | 10/2017 |
| CN | 107919868 U | 4/2018 |
| EP | 1 990 914 A2 | 11/2008 |
| EP | 2 958 144 A1 | 12/2015 |
| EP | 3 159 946 A1 | 4/2017 |
| JP | 2004-229406 A | 8/2004 |
| TW | 200614290 A | 5/2006 |
| TW | 201639426 A | 11/2016 |

OTHER PUBLICATIONS

Chen, Fully Integrated Isolated DC-DC Converter Using Micro-Transformers. IEEE. 2008; 335-338.

Krakauer, Balancing the Major Elements of an Isolator for Safety's Sake. Analog Devices. Technical Article MS-2576. 2014; 4 pages.

Lumio, Applicability of CMOS Digital Isolators in Variable-Frequency Drives. Thesis submitted for Master of Science in Technology. Aalto University School of Electrical Engineering. Jan. 1, 2016. 80 pages.

International Search Report and Written Opinion dated Feb. 14, 2018 in connection with International Application No. PCT/IB2017/001472.

U.S. Appl. No. 16/700,370, filed Dec. 2, 2019, Tanghe et al.

PCT/IB2017/001472, dated Feb. 14, 2018, International Search Report and Written Opinion.

* cited by examiner

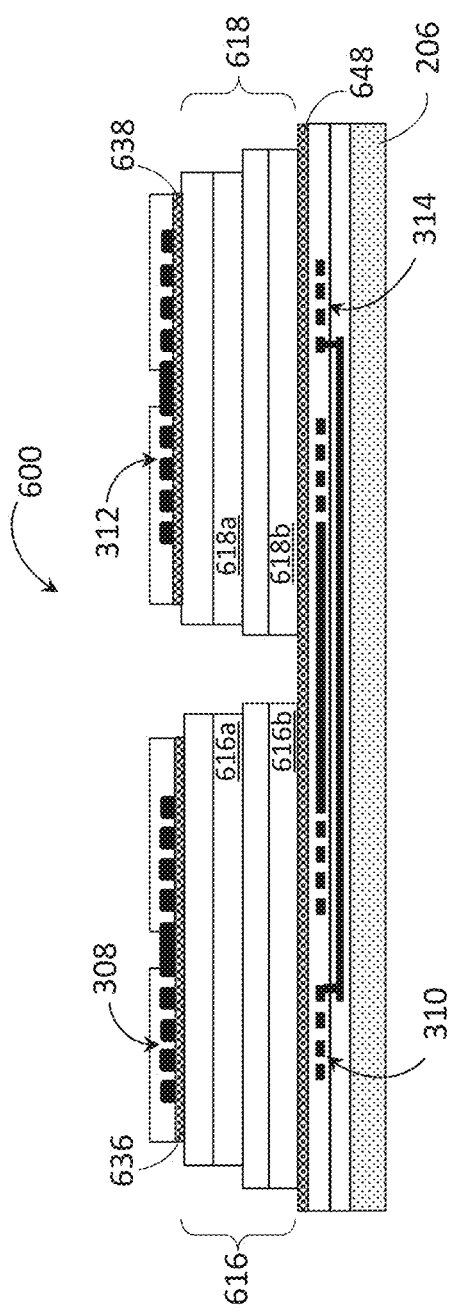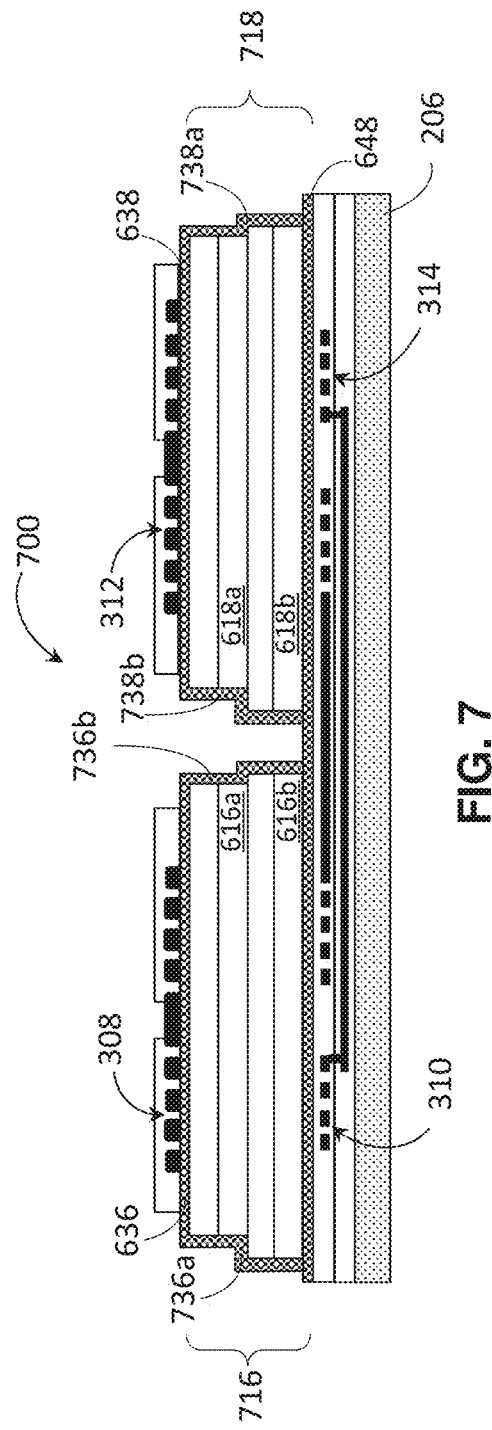

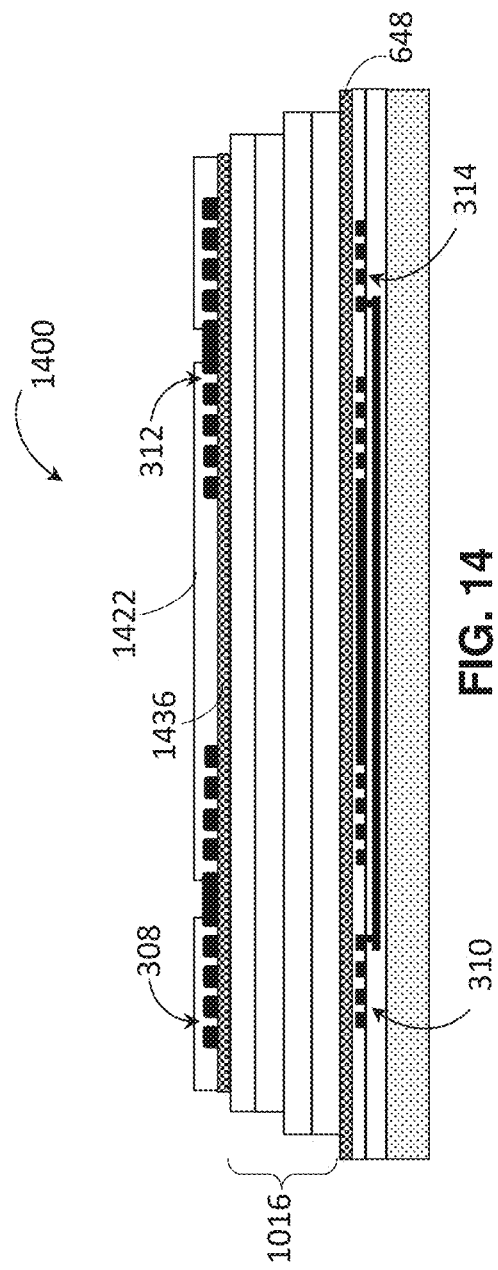
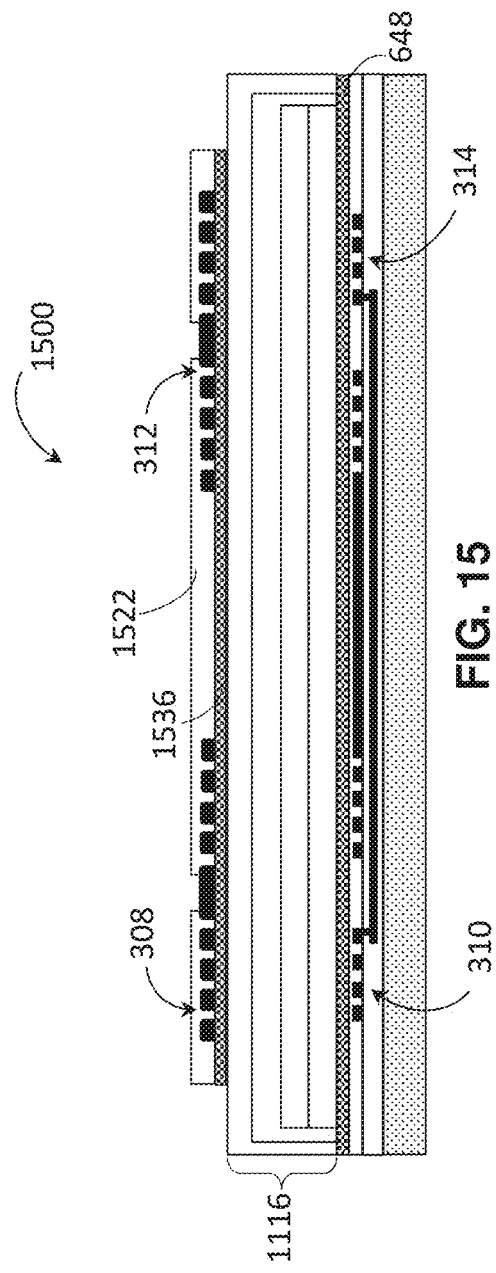

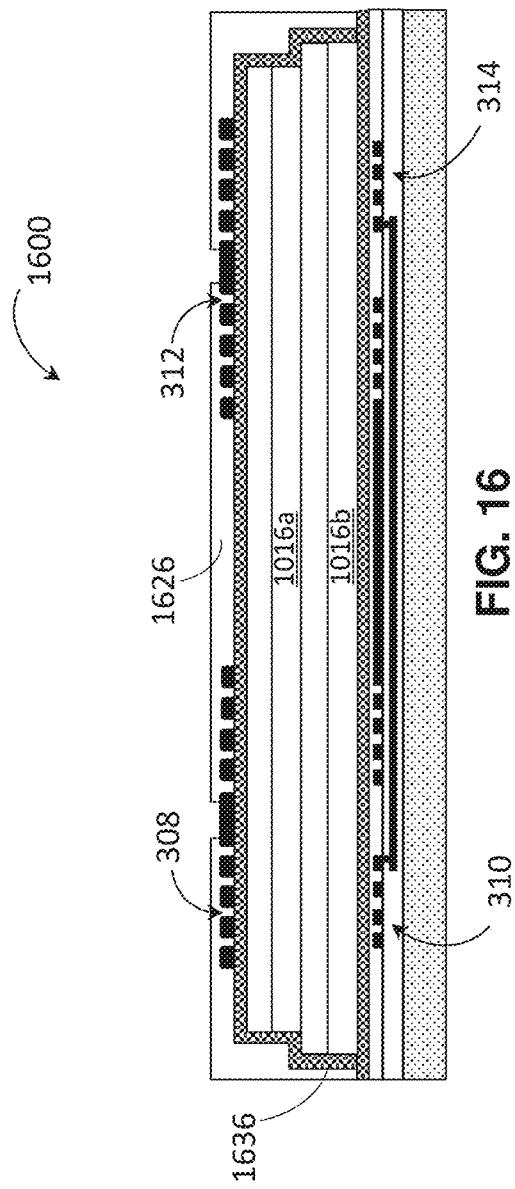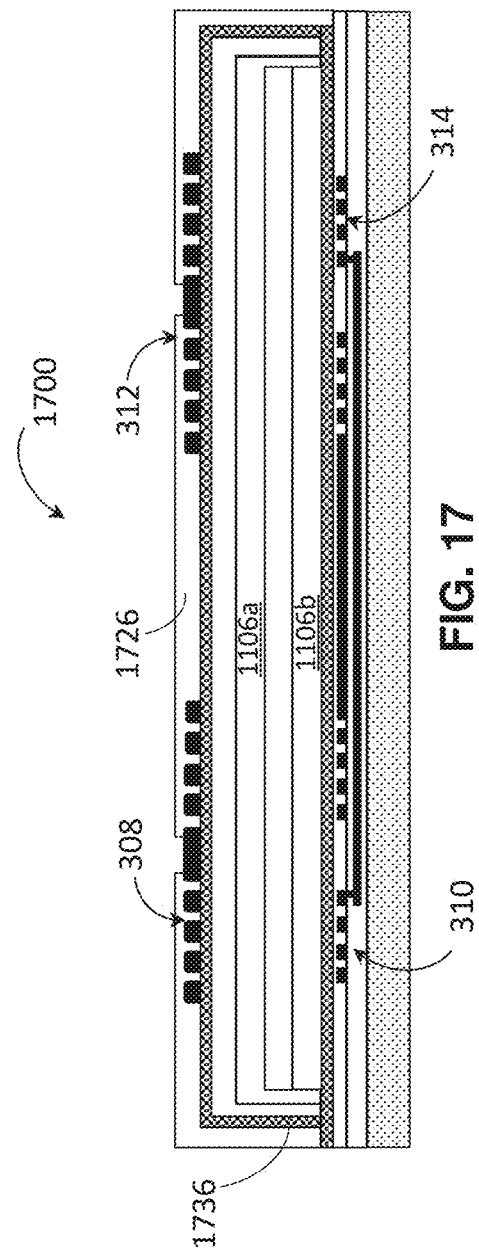

BACK-TO-BACK ISOLATION CIRCUIT

CROSS-REFERENCE TO RELATED APPLICATIONS

The present application claims the benefit under 35 U.S.C. § 119(e) of U.S. Provisional Patent Application Ser. No. 62/724,166 filed Aug. 29, 2018, and entitled "METHOD OF FORMING AN ENHANCED CHIP SCALE ISOLATOR," which is hereby incorporated herein by reference in its entirety.

FIELD OF THE DISCLOSURE

The present application relates to galvanic isolators providing galvanic isolation between circuits.

BACKGROUND

Isolators provide electrical isolation between circuits which communicate with each other. In some situations, circuits which communicate with each other operate at different voltages, for instance one at a relatively high voltage and the other at a relatively low voltage. In some situations, the circuits are referenced to different electrical ground potentials. Isolators can be used to electrically isolate circuits in either of these situations. Connecting multiple isolators in series may increase the amount of isolation between the circuits.

BRIEF SUMMARY

Isolators having a back-to-back configuration for providing electrical isolation between two circuits are described, in which multiple isolators formed on a single, monolithic substrate are connected in series to achieve a higher amount of electrical isolation for a single substrate than for isolators formed on separate substrates connected in series. Discrete dielectric regions positioned between pairs of isolator components provide electrical isolation to the isolator components in a pair as well as between the isolators of the back-to-back isolator formed on the substrate. The back-to-back isolator may provide one or more communication channels for transfer of information and/or power between the circuits connected to the isolator.

In some embodiments, an integrated isolator device is provided. The integrated isolator device comprises a substrate, and a first isolator component and a second isolator component positioned over the substrate. The first isolator component is positioned to overlap, at least partially, with the second isolator component. The integrated isolator device further comprises a third isolator component and a fourth isolator component positioned over the substrate. The third isolator component is positioned to overlap, at least partially, with the fourth isolator component. The integrated isolator device further comprises a first discrete dielectric region positioned between the first isolator component and the second isolator component, and a second discrete dielectric region positioned between the third isolator component and the fourth isolator component.

In some embodiments, a system comprising an isolator, at least one first circuit, and at least one second circuit is provided. The isolator comprises a substrate, and a first isolator component and a second isolator component positioned over the substrate. The first isolator component is positioned to electromagnetically couple with the second isolator component. The isolator further comprises a third isolator component and a fourth isolator component positioned over the substrate. The third isolator component is positioned to electromagnetically couple with the fourth isolator component. The isolator further comprises a first dielectric region positioned between the first isolator component and the second isolator component, and a second dielectric region positioned between the third isolator component and the fourth isolator component. The first dielectric region and the second dielectric region are separate regions of dielectric material. The at least one first circuit is coupled to the first isolator component and configured to operate in a first voltage domain. The at least one second circuit is coupled to the third isolator component and configured to operate in a second voltage domain different than the first voltage domain.

In some embodiments, an integrated isolator device is provided. The integrated isolator device comprises a substrate, and a first isolator component and a second isolator component positioned over the substrate. The first isolator component is positioned to electromagnetically couple with the second isolator component. The integrated isolator device further comprises a third isolator component and a fourth isolator component positioned over the substrate. The third isolator component is positioned to electromagnetically couple with the fourth isolator component. The integrated isolator device further comprises a first dielectric region positioned between the first isolator component and the second isolator component, and a second dielectric region positioned between the third isolator component and the fourth isolator component. The first dielectric region is separated from the second dielectric region by at least one gap.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

FIG. 6 shows a cross-sectional view of an integrated isolator device having a back-to-back configuration with tiered dielectric stacks having relatively high and low permittivity dielectric materials.

FIG. 7 shows a cross-sectional view of an integrated isolator device having a back-to-back configuration with tiered dielectric stacks having relatively high and low permittivity dielectric materials.

FIG. 14 shows a cross-sectional view of an integrated isolator device having a back-to-back configuration with a common dielectric stack.

FIG. 15 shows a cross-sectional view of an integrated isolator device having a back-to-back configuration with a common dielectric stack.

FIG. 16 shows a cross-sectional view of an integrated isolator device having a back-to-back configuration with a common dielectric stack.

FIG. 17 shows a cross-sectional view of an integrated isolator device having a back-to-back configuration with a common dielectric stack.

DETAILED DESCRIPTION

Figure 1:
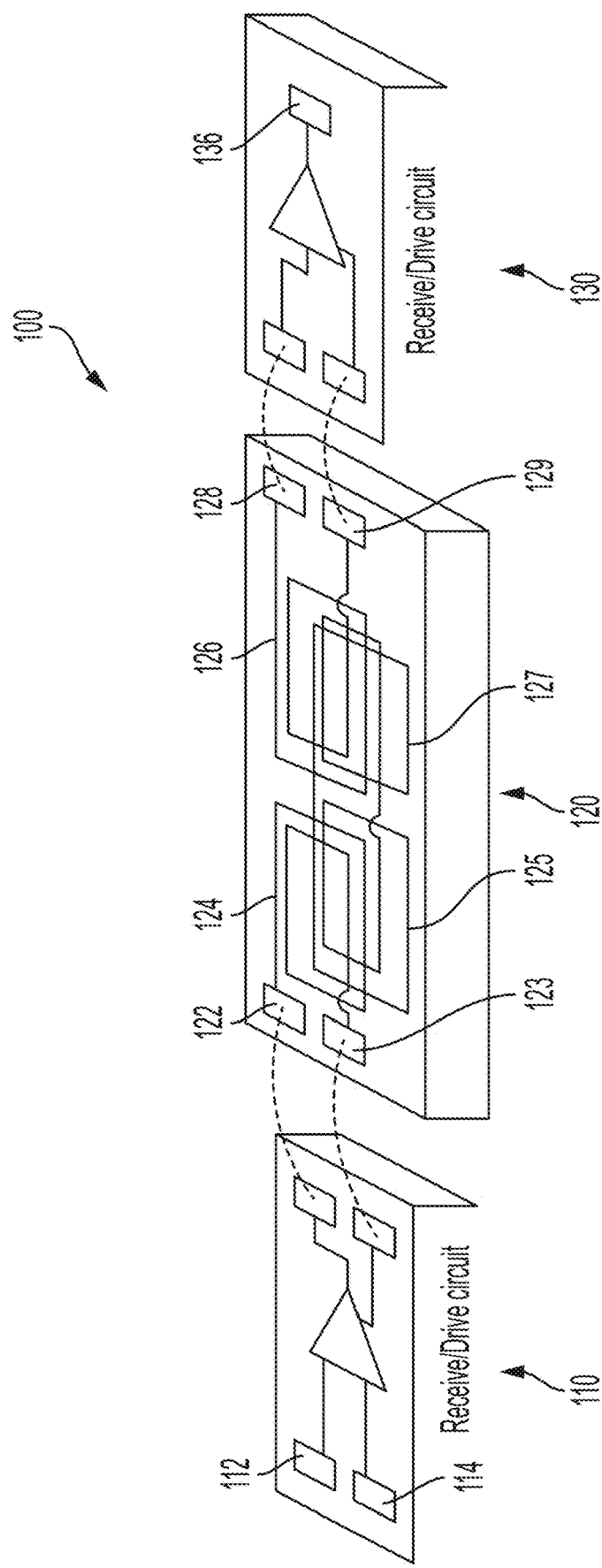
FIG. 1 is a schematic of a system having an integrated isolator device with a back-to-back configuration.

Aspects of the present application relate to a back-to-back isolator formed on a single monolithic integrated device. The back-to-back isolator includes two or more isolators connected in series formed on a single substrate. One approach for achieving a back-to-back configuration is to connect two isolators on separate substrates in series to achieve an effective isolation equaling the cumulative isolation properties of the two isolators. In contrast, aspects of the present application provide back-to-back isolators formed on a single substrate. A benefit of a monolithic configuration is that the total isolation may be the cumulative isolation properties of two isolators, with less overall footprint (chip area) because the structure has substantially similar area as a single isolator (e.g., approximately 10%-15% larger than a single isolator). For example, if each isolator in the back-to-back configuration can withstand 600 V, then the cumulative isolation the back-to-back isolator can handle is approximately 1200 V. Additionally, forming the back-to-back isolator on a single semiconductor substrate reduces costs in comparison to a multi-chip back-to-back configuration because less semiconductor substrate area is used. The higher isolation provided by the back-to-back isolator on a single substrate can be implemented in high voltage applications, such as industrial (e.g., machine monitoring) and healthcare or medical applications, which typically require high isolation voltages—for example, the ability to protect against surge events (e.g., 15 kV-20 kV)—that can be challenging to achieve with single isolators. More generally, it may be desirable to isolate voltages from approximately 400V up to approximately 20 kV, whether in steady state operation or as surge events.

In particular, aspects of the present application relate to a back-to-back isolator structure that includes a first pair of isolator components (e.g., coils or windings, or capacitive plates) forming one of the isolators and a second pair of isolator components forming the other isolator. The isolator components in each pair are arranged vertically within the integrated device, forming a top isolator component and a bottom isolator component at different vertical levels separated by dielectric material. The bottom isolator components are electrically shorted together in some embodiments and are electrically isolated from the underlying substrate and the top isolator components, forming floating bottom isolator components in the integrated device. The top isolator components are configured to act as inputs and outputs for the back-to-back isolator. For example, a top isolator component of the first pair may electrically connect to a transmitter while a top isolator component of the second pair may electrically connect to a receiver. Another benefit of the back-to-back configuration is that fewer bond connections are needed in coupling the isolator to external circuits than when using isolators formed on separate substrates connected in a back-to-back manner. In a back-to-back isolator configuration of the present application, connections to external circuitry are made to the top isolator components. In contrast, when isolators on separate substrates are used, connections are made to the bottom isolator components in addition to the top isolator components. For example, a back-to-back isolator formed on a single substrate of the present application may allow for up to, approximately, 30% fewer bonds in comparison to using isolators formed on separate substrates that are connected in series.

The back-to-back isolator configuration may be applied to various types of isolator technology, including inductive coupling isolators and capacitive coupling isolators, by forming different types of isolator components on the substrate. In embodiments where the isolator components are coils or windings, the back-to-back isolator includes two transformers connected in series. In embodiments where the isolator components are capacitive plates, the back-to-back isolator includes two capacitive isolators connected in series.

According to some aspects of the present application, the configuration of dielectric material used in the back-to-back isolator may provide not only electrical isolation between isolator components within a single isolator but also electrical isolation between the two or more isolators. Some embodiments have discrete dielectric regions for the individual isolators where one dielectric region is positioned between top and bottom isolator components of one isolator and another dielectric region is positioned between top and bottom isolator components of another isolator. In such embodiments, the discrete dielectric regions are discontinuous in the dielectric material used and/or the presence of dielectric material between neighboring isolators. In some embodiments, the discrete dielectric regions are physically separate regions of dielectric material separated by one or more gaps (e.g., air void, a dielectric material having a different permittivity, or a molding compound). A benefit of a back-to-back isolator configuration having discrete dielectric regions is that such a configuration may provide greater electrical isolation between the individual isolators that form the back-to-back isolator than if the dielectric region between the pairs of isolator components was continuous across multiple isolators. This, in turn, may improve isolation performance of the back-to-back isolator.

Aspects of the present application relate to a monolithic isolator device which connects two air core isolator transformers in a back-to-back configuration. Some such embodiments may provide increased working voltage, withstand or isolation rating, and surge robustness performance compared to alternative constructions. The back-to-back configuration may facilitate simplicity of design and deliver cost savings over separate die construction. Some back-to-back configurations have top isolator components and interconnections that electrically float whereas the bottom isolator components are directly connected to their respective isolated potentials, which can be achieved by attaching each isolator component to its respective isolated paddle. According to some embodiments, in contrast, the back-to-back isolator of the present application floats the bottom isolator components, while the top isolator components are connected to respective isolated potentials. With this approach, both back-to-back isolator components can coexist on a single substrate which has to be maintained in a floating state, such as by connecting to a floating paddle within the package.

The aspects and embodiments described above, as well as additional aspects and embodiments, are described further below. These aspects and/or embodiments may be used individually, all together, or in any combination of two or more, as the application is not limited in this respect.

FIG. 1 is a schematic of a system having an integrated isolator device with a back-to-back configuration according to aspects of the present application. System 100 includes integrated isolator device 120 coupled to receive/drive circuits 110 and 130. Integrated isolator device 120 includes two isolators connected in series on the same substrate, where one isolator includes top coil 124 and bottom coil 125 and the other isolator includes top coil 126 and bottom coil 127. Bottom coils 125 and 127 are coupled together, forming a back-to-back configuration. In each isolator, the top and bottom coils are electromagnetically coupled, which may arise from the relative proximity of the coils to each other. As shown in FIG. 1, integrated isolator device includes two transformers having coils 124, 125, 126, and 127, but it should be appreciated that some embodiments involve isolator devices having capacitive coupling isolators utilizing capacitive plates rather than coils.

Circuits 110 and 130 may act as input and output circuitry for the integrated isolator device 120. As shown in FIG. 1, circuit 110 couples to terminals 122 and 123 of coil 124 and circuit 130 couples to terminals 128 and 129 of coil 126. In some embodiments, circuit 110 may include a transmitter and circuit 130 may include a receiver such that power and/or data is transferred from circuit 110 to circuit 130 through the back-to-back isolators by transferring from coil 124 to coil 125 in one transformer and then from coil 127 to coil 126 in the other transformer. Input signals and/or power may be provided to system 100 through contacts 112 and 114 of circuit 110. Output signals and/or power may be received from system 100 through contact 136. In some embodiments, the back-to-back isolators may have a configuration allowing for transfer of signals in reverse through the coils. In such instances, circuit 130 may include a transmitter and circuit 120 may include a receiver, and power and/or data is transferred from coil 126 to coil 127 in one transformer and then from coil 125 to coil 124 in the other transformer. In this manner, the integrated isolator device 120 may allow for bi-directional transfer of signals.

Circuits 120 and 130 may be configured to operate at different voltages or may be referenced to different ground potentials, and the back-to-back isolator 120 may allow for circuits 120 and 130 to exchange data. Integrated isolator device 120 may be applied in a variety of applications (e.g., industrial, medical, consumer) where isolators may be used, including isolated control switches and isolated power supply controllers. As an example, a piece of industrial machinery may operate at high voltage and be controlled by a computer of other control equipment that operates at a much lower voltage, with the two communicating via a back-to-back isolator of the type illustrated in FIG. 1. Circuits 120 and 130 may electrically couple with two different power supplies and/or circuits 120 and 130 may have separate ground references.

Figure 2:
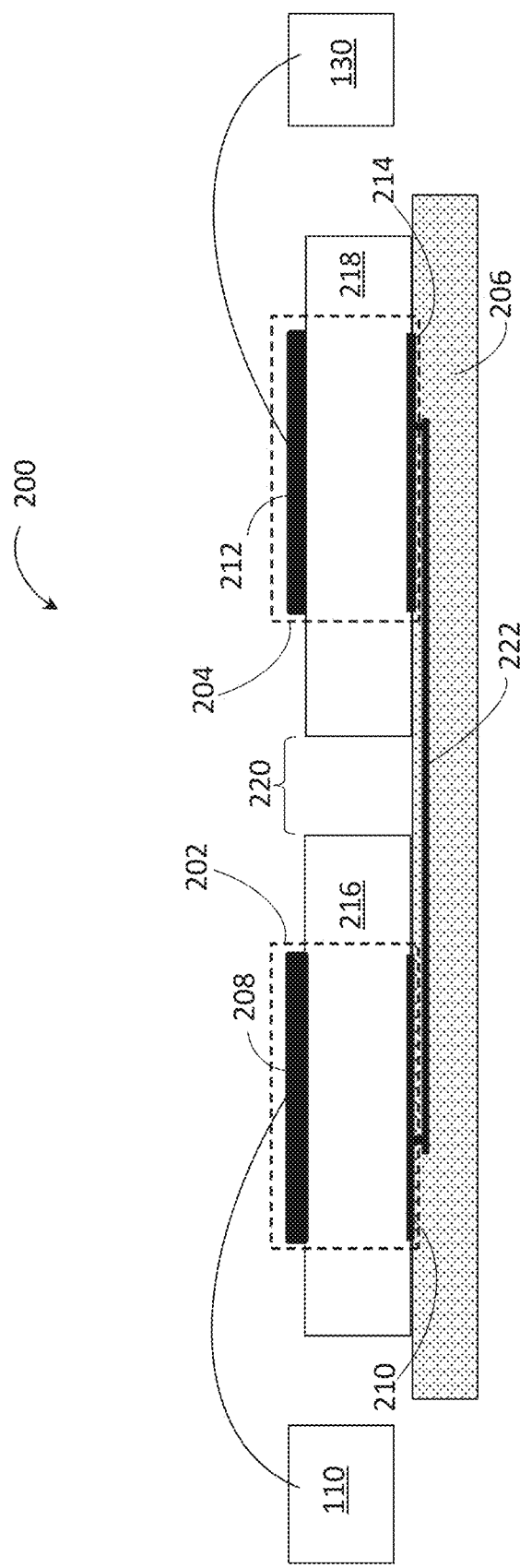
FIG. 2 is a cross-sectional view of an integrated isolator device having a back-to-back configuration.

Aspects of the present application relate to structures of a single monolithic back-to-back isolator that facilitate a desired isolation performance, including by improving electrical isolation among the isolators on the device. According to some embodiments, improved isolation can be achieved by implementing discrete dielectric regions for the individual isolators. FIG. 2 shows integrated isolator device 200 having a back-to-back configuration with discrete dielectric regions. The integrated isolator device 200 includes isolators 202 and 204 positioned over substrate 206. Each of isolators 202 and 204 has a pair of isolator components (e.g., coils or windings, capacitive plates). Isolator 202 includes isolator components 208 and 210, which are positioned to electromagnetically couple with each other. Isolator 204 includes isolator components 212 and 214, which are positioned to electromagnetically couple with each other. As shown in FIG. 2, isolator components 208 and 210 are positioned in separate vertical layers of integrated isolator device 200 and to overlap, at least partially, with each other. Similarly, isolator components 212 and 214 are positioned in separate vertical layers of integrated isolator device 200 and to overlap, at least partially, with each other. Isolator components 208 and 212 are positioned distal from substrate 206 and may be considered as "top" isolator components, while isolator components 210 and 214 are positioned proximate to substrate 206 and may be considered as "bottom" isolator components. In some embodiments, bottom isolator components 210 and 214 are formed in the same plane of the integrated isolator device. In some embodiments, top isolator components 208 and 212 are formed in the same plane of the integrated isolator device.

According to some aspects of the back-to-back configuration described herein, isolators are connected in series by coupling the bottom isolator components to each other. As shown in FIG. 2, isolators 202 and 204 are connected in series by coupling isolator component 210 to isolator component 214 through conductive trace 222. Isolator components 210 and 214 may be electrically isolated from substrate 206 and lack connections to external circuitry or ground potential, such that isolator components 210 and 214 are considered to be floating.

Integrated isolator device 200 includes discrete dielectric regions 216 and 218. Dielectric region 216 is positioned between isolator components 208 and 210. Dielectric region 218 is positioned between isolator components 212 and 214. In some embodiments, one or both of dielectric regions 216 and 218 may be formed of multiple layers of one or more dielectric materials and be considered as a dielectric stack. In some embodiments, dielectric regions 216 and 218 include polyimide.

Dielectric regions 216 and 218 are separated by gap 220, which as shown in FIG. 2 may be an air gap or air void according to some embodiments. In some embodiments, the gap may be filled with a molding compound, which may have dielectric properties substantially equal to those of the materials on either side, such as polyimide. In some embodiments, dielectric regions 216 and 218 may be separated by a gap in the dielectric material that forms dielectric regions 216 and 218 such that the dielectric material is discontinuous within a region between isolators 202 and 204 but may have one or more materials that fill the gap (e.g., another dielectric material having a different permittivity than dielectric regions 216 and 218). It should be appreciated that although a single gap is shown in the cross-sectional view of FIG. 2, multiple gaps may be positioned between dielectric regions 216 and 218.

Figure 3A:
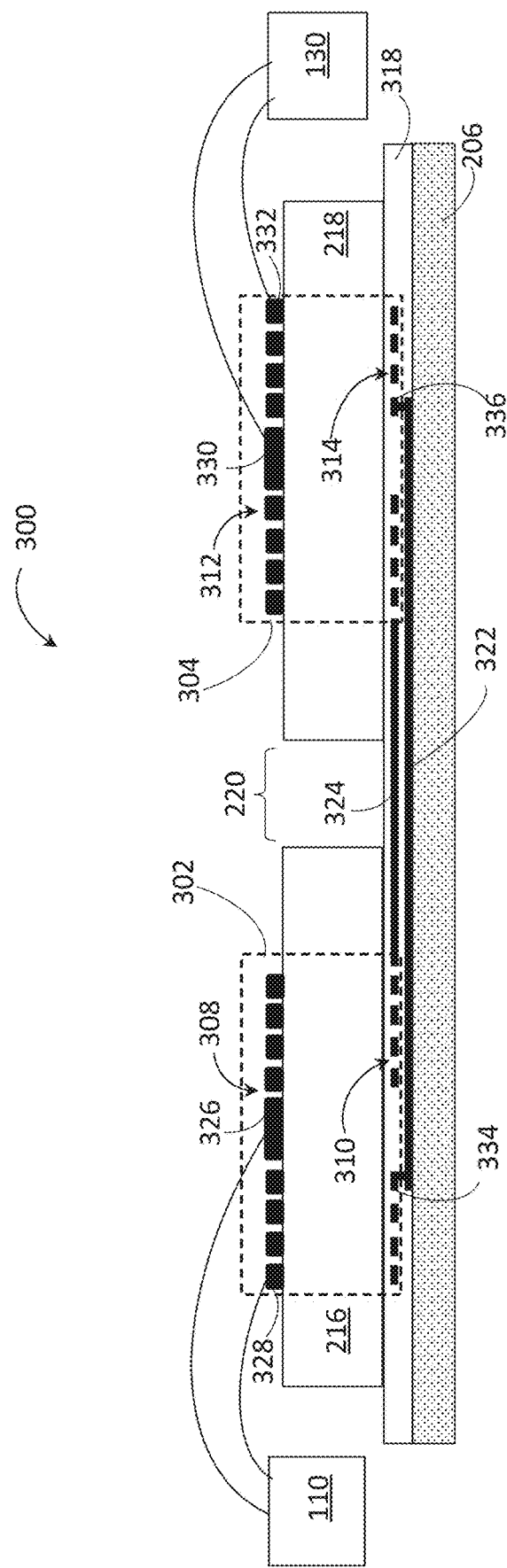
FIG. 3A is a cross-sectional view of an integrated isolator device having a back-to-back configuration by connecting two transformers in series.

FIG. 3A shows a cross-sectional view of integrated isolator device 300 having a back-to-back configuration by connecting two transformers in series. Integrated isolator device 300 includes transformer 302 and transformer 304, where transformer 302 is formed of coils 308 and 310 and transformer 304 is formed of coils 312 and 314. Coils 310 and 314 are formed within insulator layer 318, which acts to electrically isolate coils 310 and 314 from substrate 206. Insulator layer 318 may include glass, or any other suitable insulating material. FIG. 3A illustrates a cross-sectional view of coils 308, 310, 312, and 314 such that individual sections of the coils are shown, but it should be appreciated that these sections are connected together in a continuous winding, such as shown in the planar view of coils 310 and 314 in FIG. 3B.

Figure 3B:
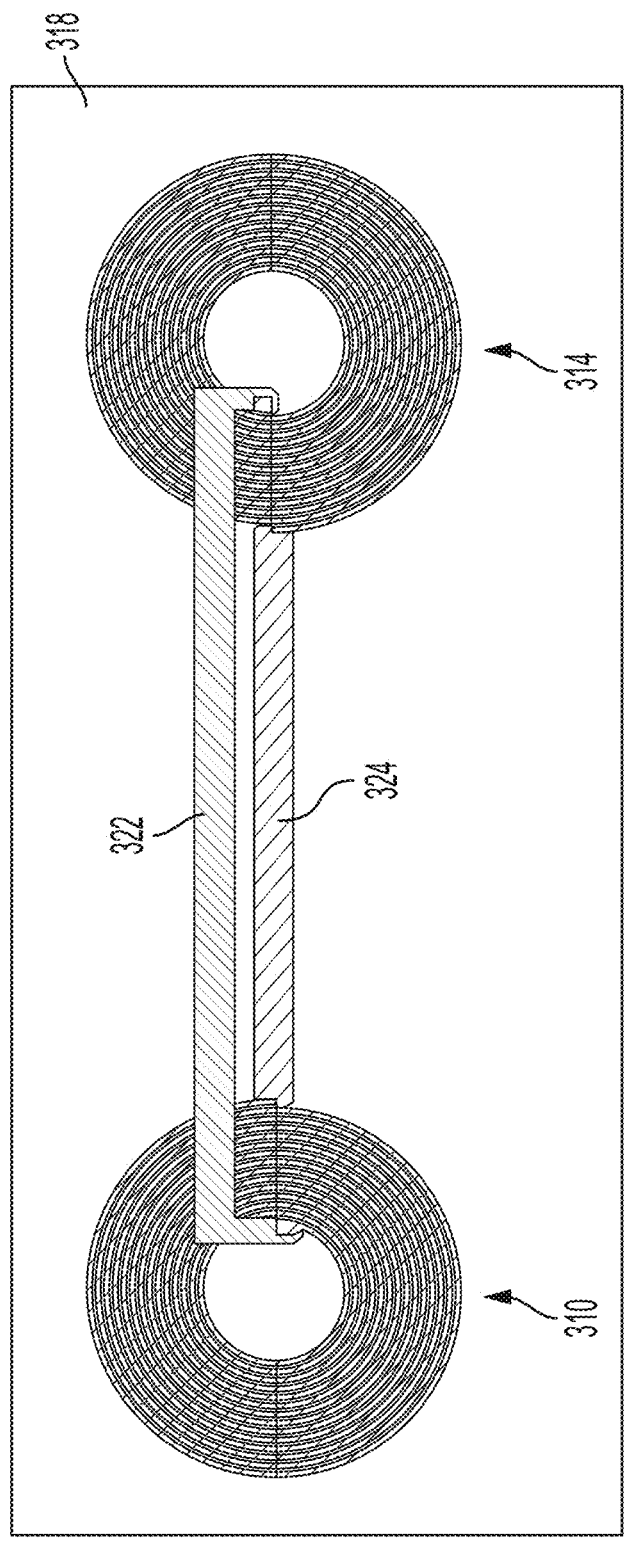
FIG. 3B is a planar view of the bottom coils of the integrated isolator device shown in FIG. 3A.

Transformers 302 and 304 are connected in series by connecting coils 310 and 314 together. According to some embodiments, coils 310 and 314 are coupled together and lack a connection to external circuitry such that coils 310 and 314 are floating. Coils 310 and 314 may be connected in series by electrically coupling the inner terminals of coils 310 and 314 together and the outer terminals of coils 310 and 314 together. As shown in FIGS. 3A and 3B, inner terminal 334 of coil 310 is electrically coupled to inner terminal 336 of coil 314 through conductive trace 322. Conductive trace 322 is vertically separated from coils 310 and 314 and may connect to inner terminals 334 and 336 through conductive vias, according to some embodiments. Additionally, conductive trace 324 electrically couples the outer terminals of coils 310 and 314 together. Conductive trace 324 may be positioned in the same plane of integrated isolator device 300 as coils 310 and 314. As shown in FIG. 3A, coils 310 and 314, conductive trace 322, and conductive trace 324 may be formed within insulator layer 318, which may act to electrically isolate one or more of these conductive components from substrate 206.

Coils 308 and 312 connect to circuitry 110 and 130, respectively, by connecting to terminals of coils 308 and 312, such as through wire bonding. As shown in FIG. 3A, a wire bond connects circuitry 110 to contact 326 of an inner terminal of coil 308 and a wire bond connects circuitry 110 to contact 328 of an outer terminal of coil 308. Similarly, a wire bond connects circuitry 130 to contact 332 of an outer terminal of coil 312 and a wire bond connects circuitry 130 to contact 330 of an inner terminal of coil 312.

Some embodiments relate to multi-channel integrated isolator devices where individual channels have a back-to-back configuration by connecting two isolators in series according to the techniques described herein. The multiple channels may be connected to different external circuitry and used to perform different operations, for example by using one channel to transfer one signal to one circuit and using another channel to transfer a different signal to a separate circuit. According to aspects of the present application, the discrete dielectric regions positioned between top and bottom isolator components of the two isolators in the back-to-back configuration may be used across the different channels. In such embodiments, a discrete dielectric region may be positioned between the top and bottom isolator components forming the isolators in separate channels. In this manner, a single dielectric region may provide electrical isolation between isolator components in more than one channel.

Figure 3D:
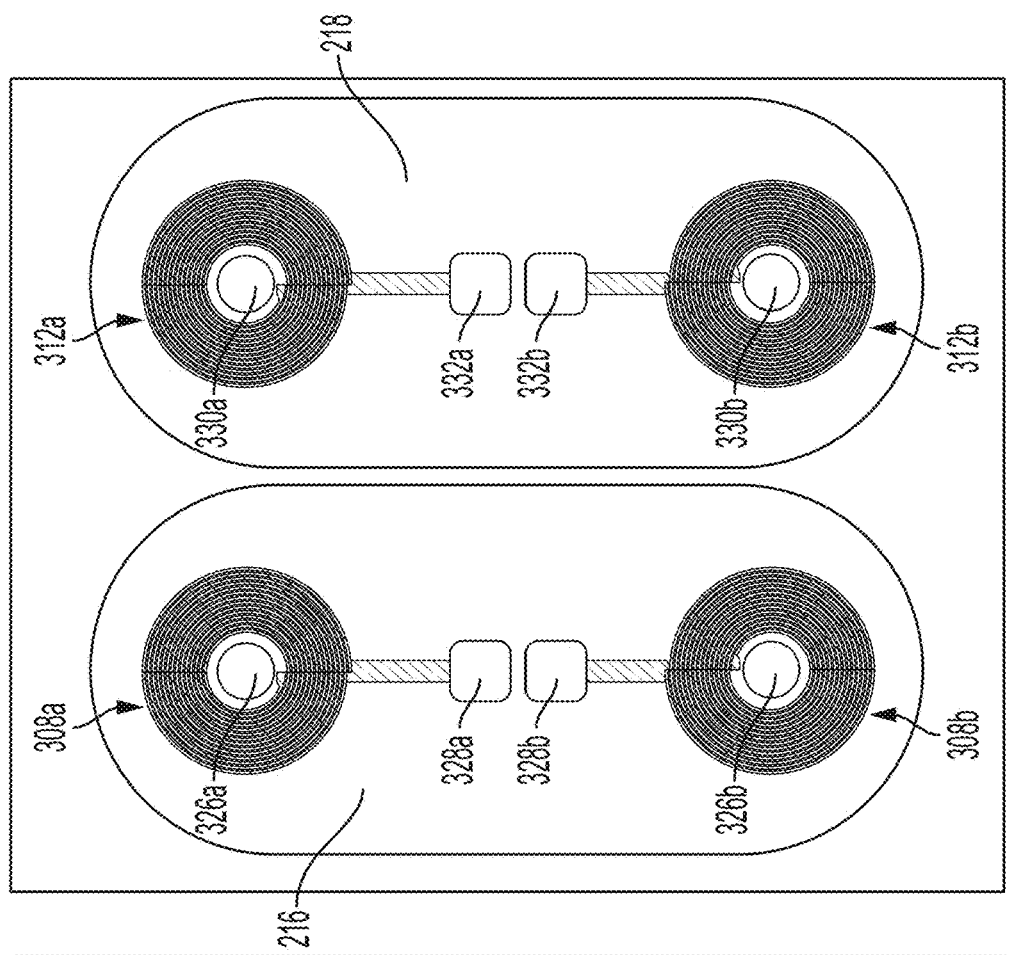
FIG. 3D is a planar view of top coils in the multi-channel integrated isolator device having the bottom coils shown in FIG. 3C.
Figure 3C:
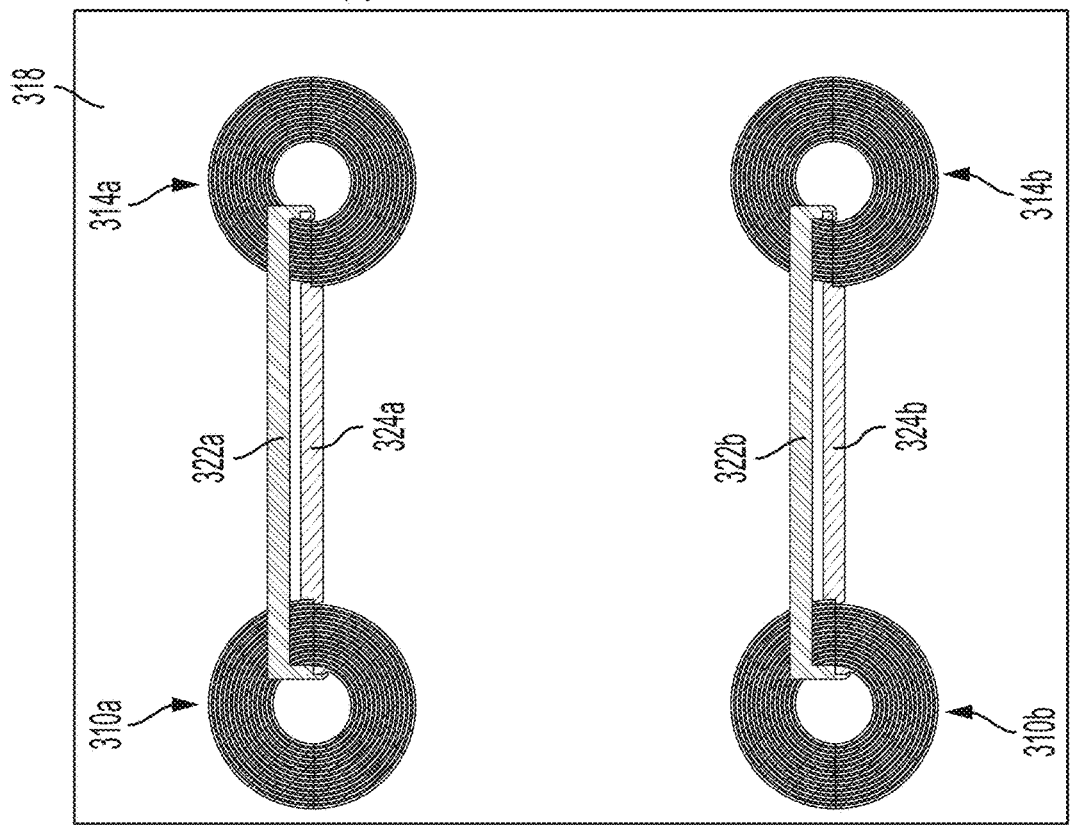
FIG. 3C is a planar view of bottom coils in a multi-channel integrated isolator device.

FIGS. 3C and 3D show planar views of bottom coils and top coils, respectively, in an exemplary multi-channel isolator device. FIG. 3C shows the bottom coils in two channels, which may be positioned within insulator layer 318 of the isolator device. In particular, bottom coils 310a and 314a form one channel and are connected in series where conductive trace 322a connects the inner terminals of bottom coils 310a and 314a and conductive trace 324a connects the outer terminals of bottom coils 310a and 314a. Similarly, bottom coils 310b and 314b form a separate channel, where conductive trace 322b connects the inner terminals of bottom coils 310b and 314b and conductive trace 324b connects the outer terminals of bottom coils 310b and 314b. FIG. 3D shows the top coils corresponding to the isolators having the bottom coils shown in FIG. 3C. Top coils 326a and 330a are positioned to electromagnetically couple with bottom coils 310a and 314a, respectively, to form one channel having a back-to-back configuration. Similarly, top coils 308b and 312b are positioned to electromagnetically couple with bottom coils 310b and 314b, respectively, to form a separate channel having a back-to-back configuration. FIG. 3D shows a planar view of discrete dielectric regions 216 and 218, which are positioned between top and bottom coils and shared across both of the channels of the isolator illustrated in FIGS. 3C and 3D. Dielectric region 216 is positioned both between top coil 308a and bottom coil 310a and between top coil 308b and bottom coil 310b. Dielectric region 218 is positioned both between top coil 312a and bottom coil 314a and between top coil 312b and bottom coil 314b.

Exemplary contacts to the top coils are shown in FIG. 3D. Contact 328a couples to the outer terminal of coil 308a and contact 326a couples to the inner terminal of coil 308a. Contact 328b couples to the outer terminal of coil 308b and contact 326b is to the inner terminal of coil 308b. Contact 332a couples to the outer terminal of coil 312a and contact 330a couples to the inner terminal of coil 312a. Contact 332b couples to the outer terminal of coil 312b and contact 330b couples to the inner terminal of coil 312b.

Figure 4:
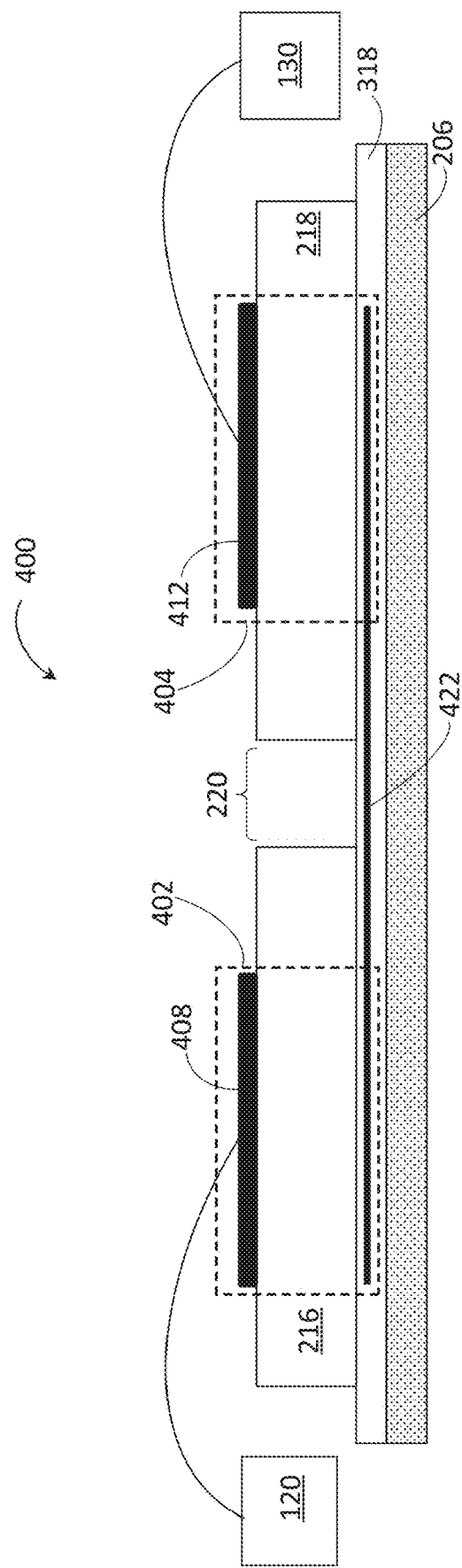
FIG. 4 shows a cross-sectional view of an integrated isolator device having a back-to-back configuration by connecting capacitive isolators in series.

Some embodiments of the present application relate to an integrated isolator device having capacitive isolators connected in series, forming a back-to-back configuration. FIG. 4 shows a cross-sectional view of an integrated isolator device having a back-to-back configuration by connecting capacitive isolators in series. As shown in FIG. 4, integrated isolator device 400 includes capacitive isolator 402 and capacitive isolator 404, where capacitive isolator 402 includes top plate 408, capacitive isolator 404 includes top plate 412, and a common conductive bottom plate 422 is used for both isolators 402 and 404. Dielectric region 216 is positioned between top plate 408 and conductive plate 422. Dielectric region 218 is positioned between top plate 412 and conductive plate 422. Dielectric region 216 and 218 are separated by gap 220. Conductive plate 422 is formed within insulator layer 318, which acts to electrically isolate conductive plate 422 from substrate 206 such that conductive plate 422 is floating during operation of integrated isolator device 400. Circuitry 120 may connect to plate 408 through one or more wire bonds. Circuitry 130 may connect to plate 412 through one or more wire bonds.

It should be appreciated that techniques and structures described in connection with isolator devices having back-to-back transformers may be similarly implemented in isolator devices having back-to-back capacitive isolators. For instance, some embodiments of a multi-channel isolator device may have multiple back-to-back capacitive isolators, similar to the multi-channel isolator device discussed in connection with FIGS. 3C and 3D but having conductive plates in place of coils. In such embodiments, the dielectric regions 216 and 218 may be shared across the multiple channels between the top and bottom conductive plates. Additionally, various embodiments of the structure and configuration of the dielectric regions positioned between top and bottom isolator components discussed herein in connection with transformers where the isolator components are coils, but it should be appreciated similar dielectric structures and configurations may be implemented in a back-to-back capacitive isolator configuration.

Some embodiments of the integrated isolator device may include a dielectric region having multiple layers of dielectric material, forming a dielectric stack positioned between isolator components in an isolator. The multiple layers in a dielectric stack may have varying dimensions, forming a tiered structure. In some embodiments, the tiered dielectric stack may include layers with decreasing length from the bottom isolator component to the top isolator component. In such embodiments, a dielectric layer in the stack proximate to the top isolator component may not extend beyond a periphery of a dielectric layer proximate to the bottom isolator component. In embodiments where the tiered dielectric stack is used for both dielectric regions of a back-to-back isolator configuration, the gap between the two dielectric regions has a variable width, where the width is smaller proximate to the substrate than distal from the substrate. Benefits provided by a tiered dielectric stack structure may include reduction or redistribution of stress within the dielectric layers during processing of the isolator device, for example stresses that occur due to thermal cycles during depositing the different layers of the isolator device.

Figure 5:
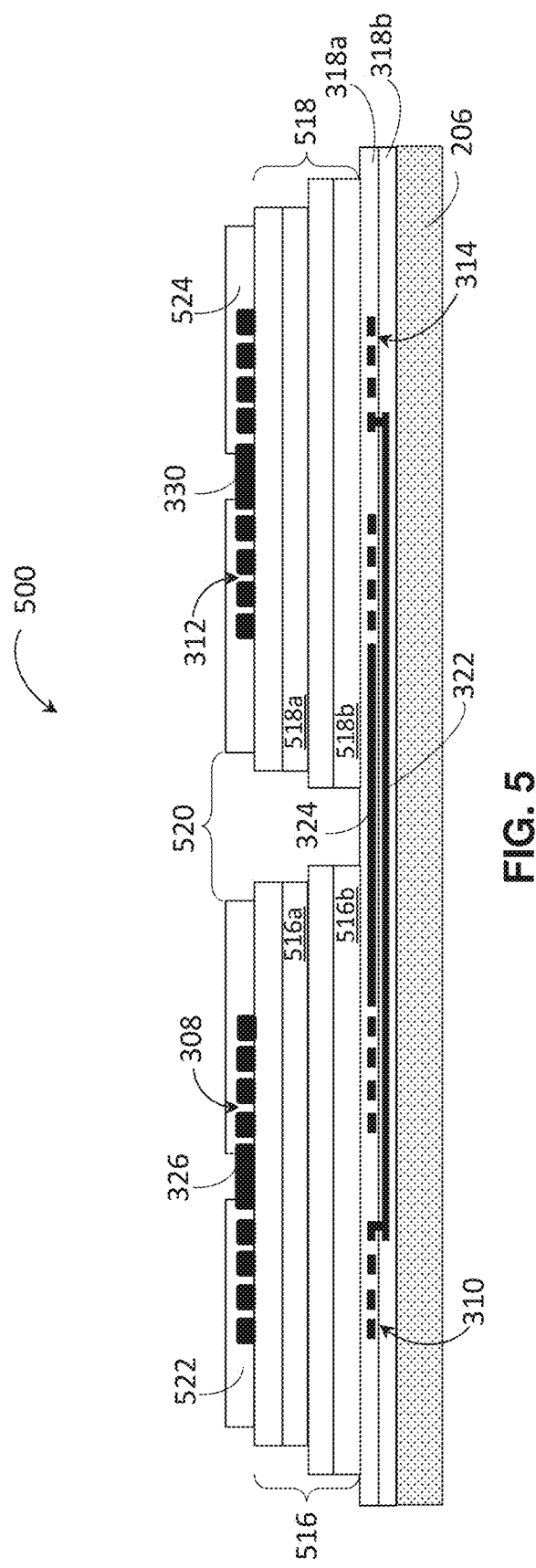
FIG. 5 shows a cross-sectional view of an integrated isolator device having a back-to-back configuration with tiered dielectric stacks positioned between pairs of isolator components.

FIG. 5 shows a cross-sectional view of integrated isolator device 500 having a back-to-back configuration with tiered dielectric stacks positioned between pairs of isolator components. Dielectric region 516 positioned between top coil 308 and bottom coil 310 has multiple dielectric layers, including dielectric layer 516b and dielectric layer 516a. Dielectric layer 516b is positioned proximate to coil 310 and has a longer length in the left-right direction of the figure than dielectric layer 516a, forming a tiered dielectric stack structure for dielectric region 516. Similarly, dielectric region 518 is positioned between top coil 312 and bottom coil 314 and has multiple dielectric layers, including dielectric layer 518b and dielectric layer 518a. Dielectric layer 518b is positioned proximate to coil 314 and has a longer length in the left-right direction of the figure than dielectric layer 518a, forming a tiered dielectric stack structure for dielectric region 518. The resulting isolator structure with the tiered dielectric stacks forms gap 520 between dielectric regions 516 and 518 with variable width in the left-right direction of the figure, where the gap width is larger proximate to top coils 308 and 312 than proximate to bottom coils 310 and 314. Dielectric regions 516 and 518 may include polyimide, according to some embodiments.

In some embodiments, bottom isolator components and conductive traces may be formed in multiple insulator layers (e.g., glass) over a single substrate. As shown in FIG. 5, coils 310 and 314 and conductive trace 324 is formed in insulator layer 318a and conductive trace 322 is formed in insulator layer 318b.

Some embodiments of the integrated isolator device may include dielectric material formed over one or more of the top isolator components (e.g., top coils, top capacitive plates). The dielectric material formed over a top isolator component may act to electrically isolate regions of the top isolator component from one another and/or from external conductors, which may interfere with the performance of the isolator. In this manner, the dielectric material may act as a protective cap to the top isolator component. In embodiments that include transformers, the dielectric material may be formed between turns of the conductive coil, providing electrical isolation between individual turns. A contact for the top isolator component may be formed through a region of the dielectric material to a portion of the top isolator component.

As shown in FIG. 5, dielectric regions 522 and 524 are formed over top coils 308 and 312, respectively. Dielectric region 522 is formed between individual turns of coil 308, and, similarly, dielectric region 524 is formed between individual turns of coil 312. Dielectric region 522 includes an opening that extends through at least a portion of the material to form contact 326 of top coil 308. Similarly, dielectric region 524 includes an opening that extends through at least a portion of the material to form contact 330 of top coil 312. In some embodiments, dielectric regions 522 and 524 include polyimide.

Some embodiments of the integrated isolator device may include a dielectric region formed of dielectric materials having different permittivity (e.g., relative permittivity) positioned between top and bottom isolator components. In such embodiments, the dielectric region may include dielectric materials with two different values of permittivity; a first, relatively low permittivity dielectric material (e.g., polyimide) and a second, relatively high permittivity dielectric material (e.g., a dielectric material with higher permittivity than polyimide, such as silicon nitride). In general, the higher the permittivity of a dielectric material, the greater its ability to withstand the electric fields generated within the isolator during operation. Thus, including dielectric materials with high permittivity may improve isolation performance. However, forming layers of high permittivity dielectric material at sufficient thicknesses to achieve desired isolation ratings may be challenging, for instance being time consuming or costly. Thus, aspects of the present application may use a combination of dielectric materials of different permittivity, with the permittivity of one of the dielectric materials being higher than that of another of the dielectric materials. In some embodiments, the higher permittivity dielectric material(s) may be formed proximate to edges of the lower permittivity dielectric material(s) and/or conductive structures (e.g., coils, plates, conductive traces). Such structures may distribute the electric field generated within the dielectric region to reduce its intensity within the lower permittivity dielectric material(s). Another benefit is that the higher permittivity dielectric regions may act to provide reinforcement to the dielectric regions used in separating the isolator components within an isolator. Various embodiments are described as including a higher permittivity dielectric material and a lower permittivity dielectric material. It should be understood that in such situations the material(s) identified as a "higher permittivity dielectric material" has a higher permittivity than the material(s) identified as a "lower permittivity dielectric material" for that embodiment. Non-limiting examples of suitable permittivity values are now provided for illustration. For example, the "lower permittivity" materials described herein may be polyimide or silicon oxide, and may have permittivities ranging from approximately 3.4 to 4.0. Higher permittivity materials may include silicon nitride, having a permittivity between approximately 7-8, aluminum oxide, having a permittivity of approximately 9, and hafnium oxide, having a permittivity of approximately 25. Other materials and permittivity values may be used consistent with the various aspects described herein.

In some embodiments, the higher permittivity dielectric material(s) may be formed between an isolator component (e.g., coil, conductive plate) and a portion of low permittivity dielectric material(s). FIG. 6 shows a cross-sectional view of integrated isolator device 600 having tiered dielectric stacks with first and second dielectric materials, one having a relatively higher permittivity than the other. Dielectric stack 616 positioned between coils 308 and 310 has lower permittivity dielectric layers, including layers 616a and 616b, and higher permittivity dielectric layer 636 positioned between top coil 308 and the lower permittivity dielectric layers. Similarly, dielectric stack 618 positioned between coils 312 and 314 has lower permittivity dielectric layers, including layers 618a and 618b, and higher permittivity dielectric layer 638 positioned between top coil 312 and the lower permittivity dielectric layers. Isolator device 600 includes higher permittivity dielectric layer 648 positioned between discrete dielectric region 616 and bottom coils 310, and between discrete dielectric region 618 and bottom coils 314. The resulting isolator structure includes a dielectric region of lower permittivity dielectric material(s) between regions of higher permittivity dielectric material(s) proximate to or in contact with the isolator components of the isolator structure.

In some embodiments, the higher permittivity dielectric material(s) may be formed, at least partially, around a portion of the lower permittivity dielectric material(s). In such embodiments, the higher permittivity dielectric material(s) may enclose some or all of a cross-section of a region of lower permittivity dielectric material(s). In some embodiments, higher permittivity dielectric material(s) in a dielectric region of an isolator may be formed on an inner surface of lower permittivity dielectric material(s) of the dielectric region proximate to the other isolator in the back-to-back configuration. In such dielectric structures, the higher permittivity dielectric material(s) are formed between a portion of lower permittivity dielectric material(s) of the same dielectric region and the discrete dielectric region of a separate isolator.

FIG. 7 shows a cross-sectional view of integrated isolator device 700 having a back-to-back configuration with tiered dielectric stacks having higher and lower permittivity dielectric materials where the higher permittivity dielectric material(s) enclose a cross-sectional region of lower permittivity dielectric material(s). Dielectric stack 716 positioned between coils 308 and 310 has higher permittivity dielectric regions 736a and 736b along the vertical sides of the lower permittivity dielectric layers. The combination of higher permittivity dielectric regions 736a and 736b in addition to layers 636 and 648 encloses lower permittivity dielectric layers, including layers 616a and 616b, within the cross-sectional view shown in FIG. 7. Similarly, dielectric stack 718 positioned between coils 312 and 314 has higher permittivity dielectric regions 738a and 738b along the vertical sides of the lower permittivity dielectric layers. The combination of higher permittivity dielectric regions 738a and 738b in addition to layers 638 and 648 encloses lower permittivity dielectric layers, including layers 618a and 618b, within the cross-sectional view shown in FIG. 7. The resulting isolator device includes higher permittivity dielectric material(s) formed along the vertical sides of lower permittivity dielectric regions 716 and 718, including between the two isolators. As shown in FIG. 7, some embodiments of the isolator device include higher permittivity dielectric material(s) 736b and 738b formed on the inner surfaces of the lower permittivity dielectric layers of regions 716 and 718, respectively.

Figure 8:
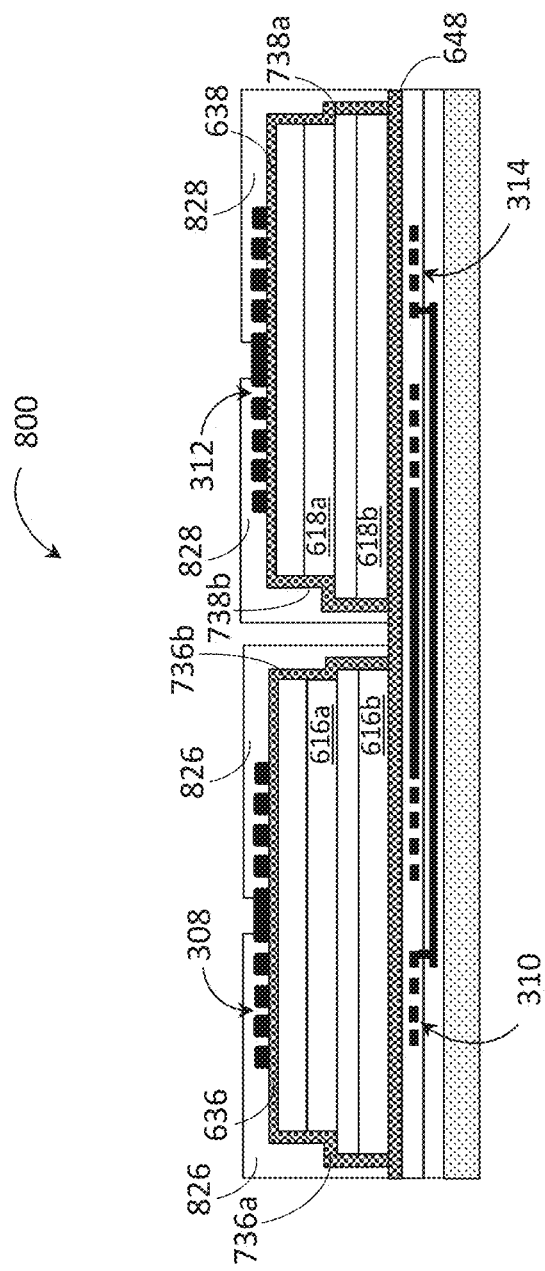
FIG. 8 shows a cross-sectional view of an integrated isolator device having a back-to-back configuration with dielectric stacks having relatively high and low permittivity dielectric materials.

In some embodiments of the integrated isolator device, lower permittivity dielectric material(s) may be formed over higher permittivity dielectric material(s) to enclose some or all the higher permittivity dielectric material(s) in a cross-section of the isolator device. The lower permittivity dielectric material(s) enclosing the high permittivity dielectric regions may act as a protective layer for the higher permittivity dielectric regions and/or the top isolator component. FIG. 8 shows a cross-sectional view of integrated isolator device 800 having a back-to-back configuration with dielectric stacks having at least two dielectric material of different permittivity, similar to FIG. 7, with additional lower permittivity dielectric regions 826 and 828. Lower permittivity dielectric region 826 is formed over top coil 308 and higher permittivity dielectric regions 636, 736a, and 736b, extending to layer 648. Lower permittivity dielectric region 828 is formed over top coil 312 and higher permittivity dielectric regions 638, 738a, and 738b, extending to layer 648. As shown in FIG. 8, contacts to top coils 308 and 312 may be formed through lower permittivity dielectric regions 826 and 828, respectively. The resulting structure may include an air void between the lower permittivity dielectric regions 826 and 828 of the two isolators, as shown in FIG. 8. In some embodiments, the lower permittivity dielectric material may fill some or all of region between the higher permittivity dielectric regions 736b and 738b to have continuous dielectric material between the two isolators with varying permittivity.

Figure 9:
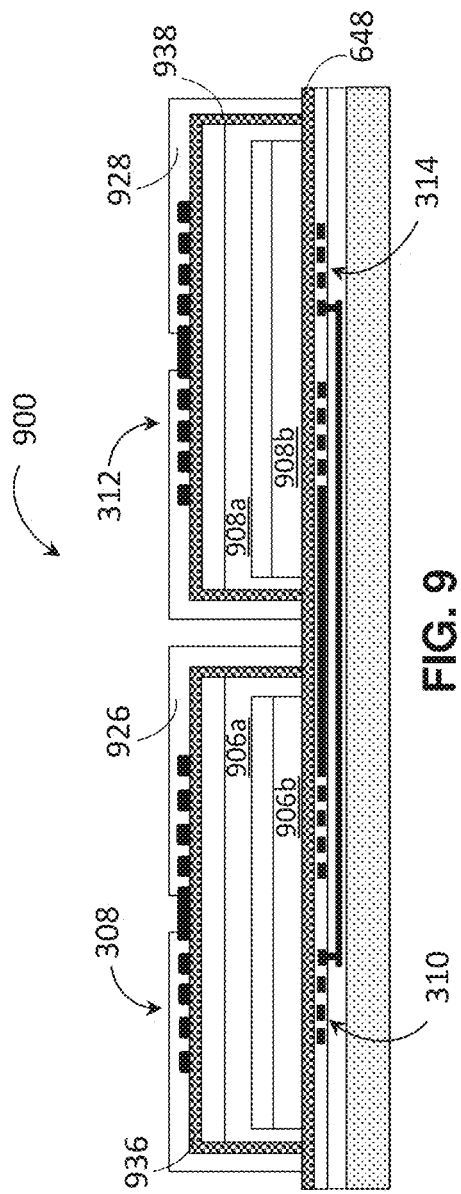
FIG. 9 shows a cross-sectional view of an integrated isolator device having a back-to-back configuration with dielectric stacks having relatively high and low permittivity dielectric materials.

FIG. 9 shows a cross-sectional view of integrated isolator device 900 having a back-to-back configuration with dielectric stacks having dielectric materials with different permittivity values, including one with a higher permittivity value and one with a lower permittivity value. In the illustrated embodiment, the lower permittivity dielectric material encloses the higher permittivity dielectric regions. The dielectric stack positioned between top coil 308 and bottom coil 310 includes lower permittivity dielectric layers 906a and 906b, where layer 906a is formed over layer 906b in a wrap-around configuration such that layer 906a extends long the edges of layer 906b to higher permittivity dielectric layer 648. Similarly, the dielectric stack positioned between top coil 312 and bottom coil 314 includes lower permittivity layers 908a and 908b, where layer 908a is formed over layer 908b in a wrap-around configuration such that layer 908a extends long the edges of layer 908b to higher permittivity dielectric layer 648. Isolator device 900 further includes lower permittivity dielectric regions 926 and 928 formed over higher permittivity dielectric regions 936 and 938, respectively, and extending to higher permittivity dielectric layer 648. Lower permittivity dielectric region 926 is formed over top coil 308 and higher permittivity dielectric region 936, and contact(s) to top coil 308 may be formed through region 926. Similarly, lower permittivity dielectric region 928 is formed over top coil 312 and higher permittivity dielectric region 938, and contact(s) to top coil 312 may be formed through region 928.

In some embodiments of the integrated isolator device, isolators connected in series may share some or all of a lower permittivity dielectric region in a common dielectric stack and have discrete higher permittivity dielectric regions associated with the individual isolators. In such embodiments, the back-to-back isolators have the lower permittivity dielectric region positioned between the top isolator components and bottom isolator components of the isolators and a discrete higher permittivity dielectric region positioned between each of the top isolator components and the common lower permittivity dielectric region. The resulting structure may include a gap (e.g., air void) between the top isolator components and between the discrete higher permittivity dielectric regions.

Figure 10:
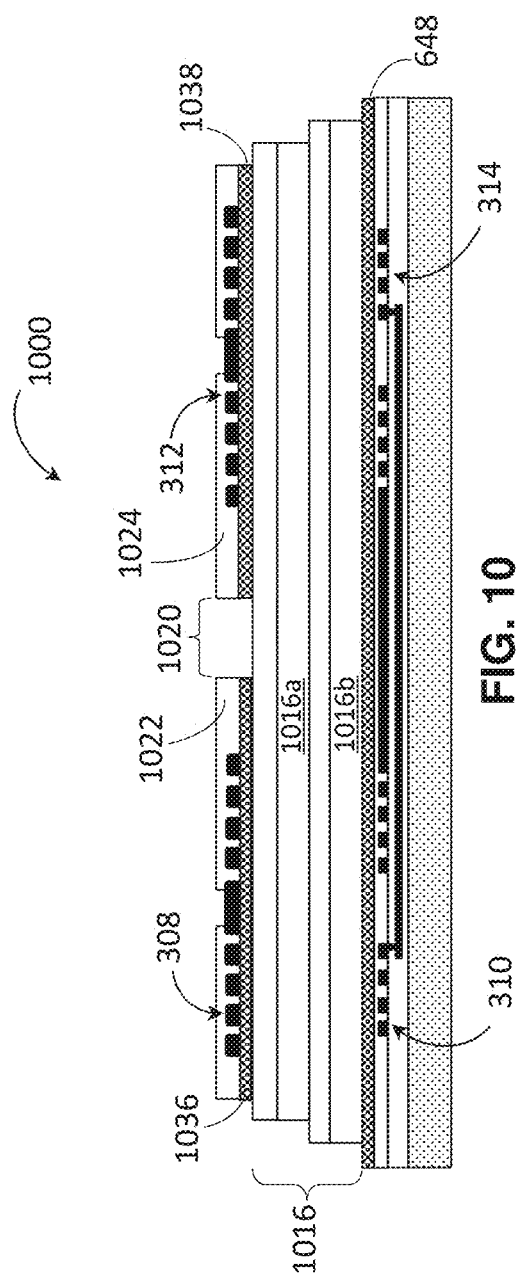
FIG. 10 shows a cross-sectional view of an integrated isolator device having a back-to-back configuration with a common lower permittivity dielectric region and discrete higher permittivity dielectric regions.

FIG. 10 shows a cross-sectional view of integrated isolator device 1000 having common lower permittivity dielectric stack 1016, including lower permittivity dielectric layers 1016a and 1016b, positioned both between top coil 308 and bottom coil 310 and between top coil 312 and bottom coil 314. Lower permittivity dielectric stack 1016 has a tiered structure with layer 1016b having a longer length in the left-right direction of the figure than layer 1016a. Isolator device 1000 further includes higher permittivity dielectric layer 1036 positioned between top coil 308 and the lower permittivity dielectric stack 1016, and higher permittivity dielectric layer 1038 positioned between top coil 312 and lower permittivity dielectric stack 1016. Lower permittivity dielectric layers 1022 and 1024 are formed over higher permittivity dielectric layers 1036 and 1038, respectively. The isolator device 1000 includes gap 1020 positioned between top coils 308 and 312 and between higher permittivity dielectric layers 1036 and 1038, extending to lower permittivity dielectric stack 1016.

Figure 11:
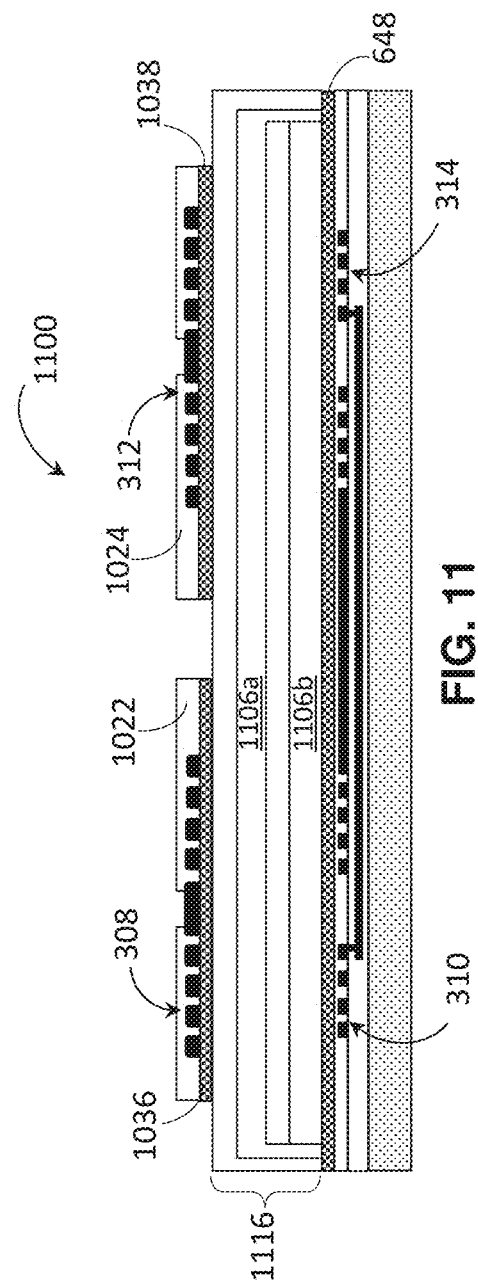
FIG. 11 shows a cross-sectional view of an integrated isolator device having a back-to-back configuration with a common lower permittivity dielectric region and discrete higher permittivity dielectric regions.

FIG. 11 shows a cross-sectional view of integrated isolator device 1100 having a back-to-back configuration with a common lower permittivity dielectric stack 1116 having a wrap-around configuration with lower permittivity dielectric layer 1106a extending beyond the edges of lower permittivity dielectric layer 1106b. Similar to the isolator device shown in FIG. 10, lower permittivity dielectric stack 1116 is common to both isolators and is positioned both between top coil 308 and bottom coil and between top coil 312 and bottom coil 314.

Figure 12:
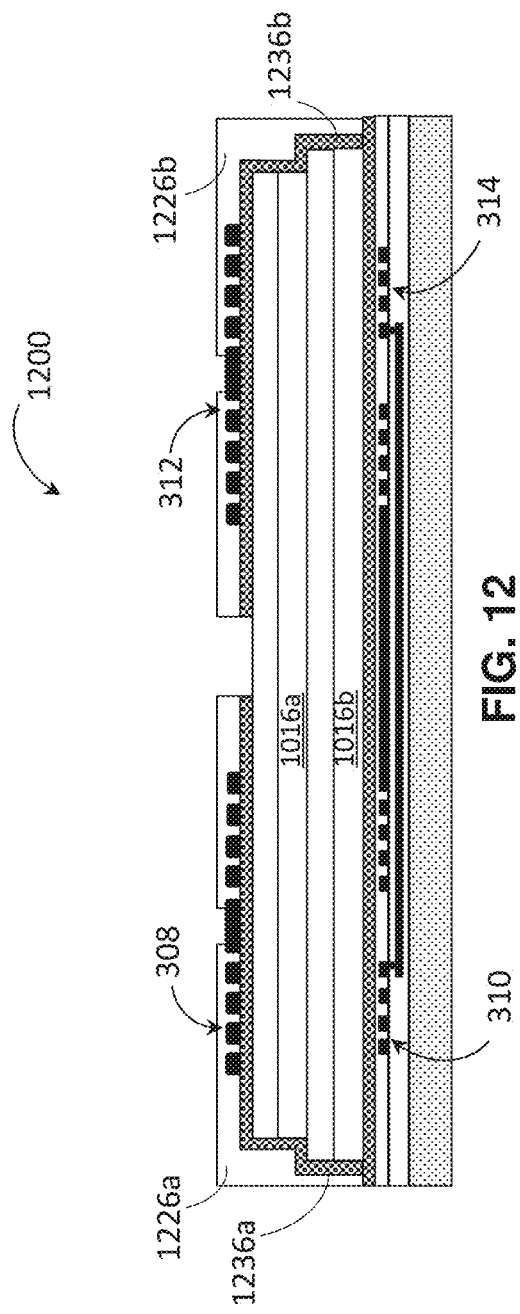
FIG. 12 shows a cross-sectional view of an integrated isolator device having a back-to-back configuration with a common lower permittivity dielectric region and discrete higher permittivity dielectric regions.

In some embodiments, a dielectric stack shared between the two isolators connected in series may include higher permittivity dielectric material along the sides or edges of layers of lower permittivity dielectric material and additional lower permittivity dielectric material formed over the higher permittivity dielectric material. FIG. 12 shows a cross-sectional view of integrated isolator device 1200 having a back-to-back configuration with a common lower permittivity dielectric stack, including layers 1016a and 1016b, having a tiered structure as discussed in connection with FIG. 10, and higher permittivity dielectric regions 1236a and 1236b formed along the outer edges of the layers in the common lower permittivity dielectric stack. Lower permittivity dielectric regions 1226a and 1226b are formed over the higher permittivity dielectric regions 1236a and 1236b. In some embodiments, higher permittivity dielectric regions 1236a and 1236a may extend to enclose some or all of the common lower permittivity dielectric stack. In some embodiments, lower permittivity dielectric regions 1226a and 1226b may extend to enclose some or all of the higher permittivity dielectric regions 1236a and 1236b and the common lower permittivity dielectric stack.

Figure 13:
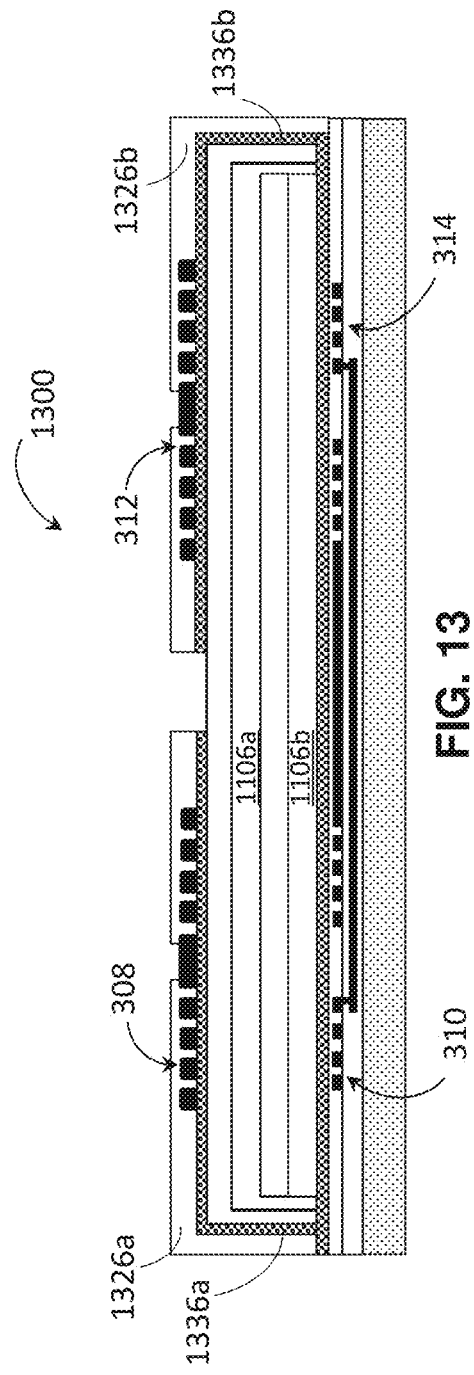
FIG. 13 shows a cross-sectional view of an integrated isolator device having a back-to-back configuration with a common lower permittivity dielectric region and discrete higher permittivity dielectric regions.

FIG. 13 shows a cross-sectional view of integrated isolator device 1300 having a back-to-back configuration with a common lower permittivity dielectric stack, including layers 1106a and 1106b, having a wrap-around configuration as discussed in connection with FIG. 11, and higher permittivity dielectric regions 1336a and 1336b formed along the outer edges of the layers in the lower permittivity dielectric region. Lower permittivity dielectric regions 1326a and 1326b are formed over the higher permittivity dielectric regions 1336a and 1336b. In some embodiments, higher permittivity dielectric regions 1336a and 1336a may extend to enclose some or all of the common lower permittivity dielectric stack. In some embodiments, lower permittivity dielectric regions 1326a and 1326b may extend to enclose some or all of the higher permittivity dielectric regions 1336a and 1336b and the common lower permittivity dielectric stack.

In some embodiments of the integrated isolator device, the back-to-back isolators share a common dielectric stack having both lower permittivity and higher permittivity dielectric materials. The common dielectric stack shared among the two isolators may have one or more of the structures described above in connection with the discrete dielectric regions. FIG. 14 shows a cross-sectional view of integrated isolator device 1400 having a back-to-back configuration with a common dielectric stack positioned both between top coil 308 and bottom coil 310 and between top coil 312 and bottom coil 314. The common dielectric stack includes tiered dielectric stack 1016, as described in connection with FIG. 10, higher permittivity dielectric layers 1436 and 648, and lower permittivity dielectric layer 1422. Both top coils 308 and 312 are formed over higher permittivity dielectric layer 1436. As another example, FIG. 15 shows a cross-sectional view of integrated isolator device 1500 having a back-to-back configuration with a common dielectric stack positioned both between top coil 308 and bottom coil 310 and between top coil 312 and bottom coil 314. The common dielectric stack includes dielectric stack 1116, having a wrap-around configuration as described in connection with FIG. 11, higher permittivity dielectric layers 1536 and 648, and lower permittivity dielectric layer 1522. Both top coils 308 and 312 are formed over higher permittivity dielectric layer 1536.

In some embodiments, a common dielectric stack shared among the two back-to-back isolators may include higher permittivity dielectric material enclosing some or all of a lower permittivity dielectric region. FIG. 16 shows a cross-sectional view of integrated isolator device 1600 having a back-to-back configuration with a common dielectric stack positioned both between top coil 308 and bottom coil 310 and between top coil 312 and bottom coil 314. The common dielectric stack includes a tiered dielectric stack having layers 1016a and 1016b, higher permittivity dielectric region 1636 formed over the tiered dielectric stack, and lower permittivity dielectric region 1626 formed over higher permittivity dielectric region 1636. Both top coils 308 and 312 are formed over higher permittivity dielectric region 1636. As another example, FIG. 17 shows a cross-sectional view of integrated isolator device 1700 having a back-to-back configuration with a common dielectric stack positioned both between top coil 308 and bottom coil 310 and between top coil 312 and bottom coil 314. The common dielectric stack includes a dielectric stack with a wrap-around configuration having layers 1116a and 1116b, higher permittivity dielectric region 1736 formed over the dielectric stack with the wrap-around configuration, and lower permittivity dielectric region 1726 formed over higher permittivity dielectric region 1736. Both top coils 308 and 312 are formed over higher permittivity dielectric region 1736.

Figure 18:
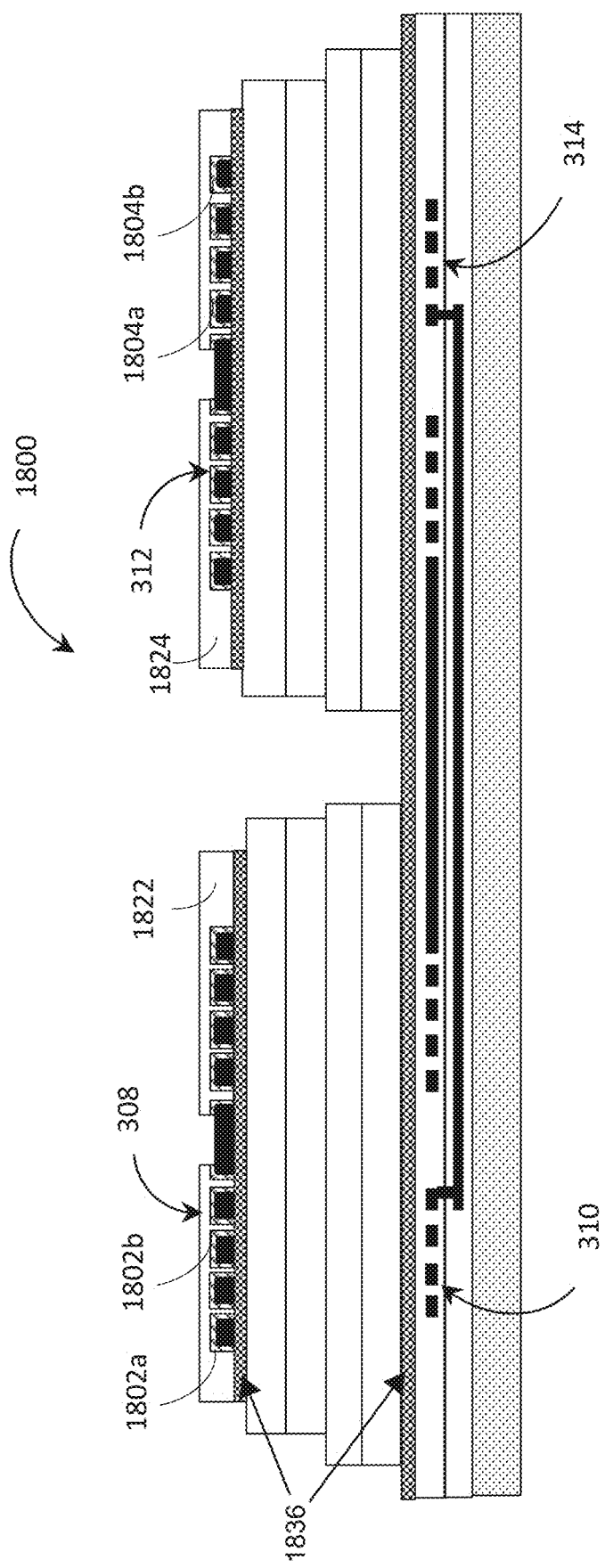
FIG. 18 shows a cross-sectional view of an integrated isolator device having a back-to-back configuration with dielectric material surrounding the turns in the top coils.

In some embodiments of the integrated isolator device, an isolator may include dielectric materials with different permittivity values, including at least one higher permittivity dielectric material and one lower permittivity dielectric material, and in which the higher permittivity dielectric material may be formed, at least partially, around the individual turns of a coil of the isolator. The dielectric material formed around the individual turns of the coil may have a higher permittivity than dielectric material formed over the top coil (e.g., polyimide). FIG. 18 shows a cross-sectional view of integrated isolator device 1800 having a back-to-back configuration with dielectric regions 1802a and 1802b formed around at least a portion of the individual turns of top coil 308 and dielectric regions 1804a and 1804b formed around at least a portion of the individual turns of top coil 312. Dielectric regions 1802a and 1802b may include dielectric material(s) having a higher permittivity than dielectric region 1822 (e.g., polyimide). As shown in FIG. 18, dielectric region 1822 is formed over top coil 308 and dielectric regions 1802a and 1802b. Dielectric regions 1804a and 1804b may include dielectric material(s) having a higher permittivity than dielectric region 1824 (e.g., polyimide). Similarly, as shown in FIG. 18, dielectric region 1824 is formed over top coil 312 and dielectric regions 1804a and 1804b. Dielectric region 1836 may be included as well, and may represent a high permittivity dielectric region like that described previously in connection with high permittivity dielectric region 1736. The dielectric region 1836 may be the same material as dielectric regions 1802a, 1802b, 1804a, and 1804b, although in some embodiments they may be different materials. Thus, it should be appreciated that multiple dielectrics of different permittivities may be used. It should be appreciated that these structures of enclosing the individual turns of a coil, at least partially, with a higher permittivity dielectric material may be used in combination with any of the above described embodiments of the integrated isolator device.

Various embodiments have been described as providing isolators with at least two different dielectric materials with different permittivity values. The specific permittivity values of the materials are not limiting, as various materials with relatively higher and lower permittivity values may be used. However, non-limiting examples are now provided. Non-limiting examples of the higher permittivity dielectric materials that may be used around individual turns of the isolator coils, such as dielectric regions 1802a, 1802b, 1804a, and 1804b, include silicon nitride (SiN), aluminum oxide ($Al_2O_3$), tantalum pentoxide ($Ta_2O_5$), strontium titanate ($SrTiO_3$), bismuth ferrite ($BiFeO_3$), silicon dioxide ($SiO_2$), and barium strontium titinate (BST).

A non-limiting example of the lower permittivity dielectric materials that may be used in embodiments of the dielectric regions described herein, such as lower permittivity dielectric regions 616, 618, 826, 828, 906, 908, 926, 928, 1016, 1022, 1024, 1116, 1226, 1326, 1422, 1522, 1626, and 1726, includes polyimide.

Non-limiting examples of higher permittivity dielectric materials that may be used in embodiments of the dielectric regions described herein, such as higher permittivity dielectric regions 636, 638, 648, 736a, 736b, 738a, 738b, 936, 938, 1036, 1038, 1236, 1336, 1436, 1536, 1636, and 1736, include silicon nitride (SiN), aluminum oxide ($Al_2O_3$), tantalum pentoxide ($Ta_2O_5$), strontium titanate ($SrTiO_3$), bismuth ferrite ($BiFeO_3$), silicon dioxide ($SiO_2$), and barium strontium titinate (BST).

Examples of conductive materials that may be used to form isolator components (e.g., coils, plates) in embodiments of the integrated isolator device described herein, such as isolator components 208, 210, 212, and 214; coils 308, 310, 312, and 314; and plates 408, 412, and 422, and conductive traces, such as conductive traces 222, 322, and 324, include gold and copper, or any other suitable conductive material.

Examples of substrate materials that may be used in embodiments of the integrated isolator device described herein, such as substrate 206, include silicon, quartz, and laminate. In some embodiments, the substrate of the integrated isolator device may be an insulating substrate. In some embodiments, the integrated isolator device may be formed on a silicon, quartz, or laminate substrate, which is formed over an insulating substrate.

The back-to-back integrated isolator devices described herein may be used in various applications (e.g., industrial, medical, consumer). For example, data transfer and/or power transfer between galvanically isolated systems may be accomplished with the integrated isolator devices described herein. As one example, medical equipment in a room in which a medical procedure is being performed may be galvanically isolated from a control system in a control room. For instance, a piece of medical imaging equipment and/or monitors in the room in which the procedure is being performed may be isolated from a system controlling operation of the imaging equipment and/or display. The isolator may be a back-to-back integrated isolator device of any of the types described herein, and the isolated signal path may be analog or digital.

As another example, industrial equipment may be isolated from a control system controlling the equipment. For example, high wattage motors may be isolated from control systems controlling their operation by integrated isolator device of the types described herein. The control systems may operate at a lower wattage than the high wattage motors used by the industrial equipment. The isolator may be disposed on a circuit board on which various circuit components connected to the motors and/or control equipment are included.

Other uses of the integrated isolator devices described herein are also possible, as those examples described are non-limiting.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

The invention claimed is:

1. An integrated back-to-back isolator device comprising:
   a substrate;
   a first isolator component and a second isolator component positioned over the substrate, wherein the first isolator component is positioned to overlap, at least partially, with the second isolator component;
   a third isolator component and a fourth isolator component positioned over the substrate, wherein the third isolator component is positioned to overlap, at least partially, with the fourth isolator component, wherein the second isolator component and the fourth isolator component are floating, and wherein the second isolator component is connected to the fourth isolator component by an electrical conductor;
   a first discrete dielectric region positioned between the first isolator component and the second isolator component; and
   a second discrete dielectric region positioned between the third isolator component and the fourth isolator component,
   wherein the integrated back-to-back isolator device is configured to transfer signals from the first isolator component to the second isolator component, from the second isolator component to the fourth isolator component, and from the fourth isolator component to the third isolator component.

2. The integrated back-to-back isolator device of claim 1, wherein the first discrete dielectric region includes a first dielectric material and a second dielectric material having a higher permittivity than the first dielectric material.

3. The integrated back-to-back isolator device of claim 2, wherein the second dielectric material is formed at least partially around a portion of the first dielectric material.

4. The integrated back-to-back isolator device of claim 2, wherein the second dielectric material is formed between the first isolator component and a portion of the first dielectric material of the first discrete dielectric region.

5. The integrated back-to-back isolator device of claim 2, wherein the second dielectric material is formed between a portion of the first dielectric material of the first discrete dielectric region and the second discrete dielectric region.

6. The integrated back-to-back isolator device of claim 1, further comprising dielectric material formed at least partially over the first isolator component and the third isolator component.

7. The integrated back-to-back isolator device of claim 1, wherein at least one gap is between the first isolator component and the third isolator component.

8. The integrated back-to-back isolator device of claim 1, wherein the first isolator component is electrically isolated from the third isolator component, and the first isolator component is configured to operate at a first voltage and the third isolator component is configured to operate at a second voltage different than the first voltage.

9. The integrated back-to-back isolator device of claim 1, wherein the second isolator component and the fourth isolator component are both electrically isolated from the substrate.

10. The integrated back-to-back isolator device of claim 9, wherein the integrated back-to-back isolator device includes a first transformer and a second transformer, the second isolator component is a first coil of the first transformer and the fourth isolator component is a first coil of the second transformer, and the first coil of the first transformer has an inner terminal connected to an inner terminal of the first coil of the second transformer, and the first coil of the first transformer has an outer terminal connected to an outer terminal of the first coil of the second transformer.

11. A system comprising:
    a back-to-back isolator comprising:
        a substrate;
        a first isolator component and a second isolator component positioned over the substrate, wherein the first isolator component is positioned to electromagnetically couple with the second isolator component;
        a third isolator component and a fourth isolator component positioned over the substrate, wherein the third isolator component is positioned to electromagnetically couple with the fourth isolator component, wherein the second isolator component and the fourth isolator component are floating, and wherein the second isolator component is connected to the fourth isolator component by an electrical conductor;
        a first dielectric region positioned between the first isolator component and the second isolator component; and
        a second dielectric region positioned between the third isolator component and the fourth isolator component, wherein the first dielectric region and the second dielectric region are separate regions of dielectric material,
        wherein the back-to-back isolator is configured to transfer signals from the first isolator component to the second isolator component, from the second isolator component to the fourth isolator component, and from the fourth isolator component to the third isolator component;
    at least one first circuit coupled to the first isolator component and configured to operate in a first voltage domain; and
    at least one second circuit coupled to the third isolator component and configured to operate in a second voltage domain different than the first voltage domain.

12. The system of claim 11, wherein the first dielectric region includes a first dielectric material and a second dielectric material having a higher permittivity than the first dielectric material.

13. The system of claim 12, wherein the second dielectric material is formed at least partially around a portion of the first dielectric material.

14. The system of claim 11, wherein the at least one first circuit includes a transmitter or a receiver and the at least one second circuit includes a transmitter or a receiver.

15. The system of claim 11, further comprising a plurality of electrical contacts coupled to the first isolator component and a plurality of electrical contacts coupled to the third isolator component.

16. An integrated back-to-back isolator device comprising:
    a substrate;

a first isolator component and a second isolator component positioned over the substrate, wherein the first isolator component is positioned to electromagnetically couple with the second isolator component;

a third isolator component and a fourth isolator component positioned over the substrate, wherein the third isolator component is positioned to electromagnetically couple with the fourth isolator component, wherein the second isolator component and the fourth isolator component are floating, and wherein the second isolator component is connected to the fourth isolator component by an electrical conductor;

a first dielectric region positioned between the first isolator component and the second isolator component; and a second dielectric region positioned between the third isolator component and the fourth isolator component, wherein the first dielectric region is separated from the second dielectric region by at least one gap, wherein the integrated back-to-back isolator device is configured to transfer signals from the first isolator component to the second isolator component, from the second isolator component to the fourth isolator component, and from the fourth isolator component to the third isolator component.

17. The integrated back-to-back isolator device of claim 16, wherein the first dielectric region includes a first dielectric material and a second dielectric material having a higher permittivity than the first dielectric material.

18. The integrated back-to-back isolator device of claim 17, wherein the second dielectric material is formed at least partially around a portion of the first dielectric material.

19. The integrated back-to-back isolator device of claim 16, wherein the second isolator component and the fourth isolator component are formed in a layer of the integrated isolator device.

20. The integrated back-to-back isolator device of claim 16, wherein at least one of the first dielectric region or the second dielectric region includes at least one layer of polyimide.

21. The integrated back-to-back isolator device of claim 1, wherein the substrate includes quartz.

22. The integrated back-to-back isolator device of claim 1, wherein the substrate includes laminate.

23. The integrated back-to-back isolator device of claim 16, wherein the substrate includes quartz.

24. The integrated back-to-back isolator device of claim 16, wherein the substrate includes laminate.

* * * * *